US012510866B2

(12) United States Patent
Mentzer et al.

(10) Patent No.: US 12,510,866 B2
(45) Date of Patent: Dec. 30, 2025

(54) TIMEPIECE MOVEMENT COMPRISING A COUNTDOWN CHRONOGRAPH MECHANISM AND A STRIKING MECHANISM

(71) Applicant: PATEK PHILIPPE SA GENÈVE, Geneva (CH)

(72) Inventors: Cédric Mentzer, Beaumont (FR); Nicolas Schlappi, Beaumont (FR); Marc-Antoine Sudan, St-Oyens (CH)

(73) Assignee: PATEK PHILIPPE SA GENÈVE, Geneva (CH)

( * ) Notice: Subject to any disclaimer, the term of this patent is extended or adjusted under 35 U.S.C. 154(b) by 560 days.

(21) Appl. No.: 17/922,191

(22) PCT Filed: Apr. 27, 2021

(86) PCT No.: PCT/EP2021/060999

§ 371 (c)(1),
(2) Date: Oct. 28, 2022

(87) PCT Pub. No.: WO2021/219646

PCT Pub. Date: Nov. 4, 2021

(65) Prior Publication Data

US 2023/0161297 A1 May 25, 2023

(30) Foreign Application Priority Data

Apr. 29, 2020 (EP) .................................... 20172014

(51) Int. Cl.
*G04F 3/02* (2006.01)
*G04F 7/08* (2006.01)

(52) U.S. Cl.
CPC ............ *G04F 3/022* (2013.01); *G04F 7/0866* (2013.01)

(58) Field of Classification Search
CPC .......... G04F 3/022; G04F 7/08; G04F 7/0866; G04F 7/089; G04B 23/06
See application file for complete search history.

(56) References Cited

U.S. PATENT DOCUMENTS 989,807 A 4/1911 Robins
1,153,466 A 9/1915 Tuerk
(Continued)

FOREIGN PATENT DOCUMENTS

CH 704705 9/2012
EP 3 904 967 A1 11/2021
(Continued)

OTHER PUBLICATIONS

International Search Report for PCT/EP2021/060999, mailed Jun. 25, 2021, 4 pages.
(Continued)

*Primary Examiner* — Edwin A. Leon
*Assistant Examiner* — Jason M Collins
(74) *Attorney, Agent, or Firm* — NIXON & VANDERHYE

(57) ABSTRACT

A mechanical timepiece movement includes a chronograph mechanism arranged to be capable of carrying out at least one countdown of a predetermined time interval, including a display arranged to display at least the time remaining until the end of the countdown of the predetermined time interval, at least one member for controlling the start of the countdown, and a striking-mechanism. The striking-mechanism is arranged to start striking at a specified time before the end of the countdown and to stop striking at the end of the countdown of the predetermined time interval.

16 Claims, 17 Drawing Sheets

(56) References Cited

U.S. PATENT DOCUMENTS

| | | | | |
|---|---|---|---|---|
| 7,597,471 | B2 * | 10/2009 | Perret .................. | G04F 7/0847 368/106 |
| 2004/0022133 | A1 | 2/2004 | Schmiedchen et al. | |
| 2004/0090869 | A1 | 5/2004 | Schmiedchen | |
| 2004/0090870 | A1 * | 5/2004 | Schmiedchen ......... | G04F 3/022 368/72 |
| 2004/0095850 | A1 * | 5/2004 | Schmiedchen ........ | G04B 19/25 368/190 |

FOREIGN PATENT DOCUMENTS

| | | | |
|---|---|---|---|
| FR | 1154660 | | 4/1958 |
| JP | S5692341 | U | 7/1981 |
| JP | H0552967 | A | 3/1993 |
| JP | 2004522157 | A | 7/2004 |
| JP | 2004525370 | A | 8/2004 |

OTHER PUBLICATIONS

Written Opinion of the ISA for PCT/EP2021/060999, mailed Jun. 25, 2021, 6 pages.

Office Action, issued in Japanese Patent Application No. 2022-566091 dated Jan. 29, 2025.

* cited by examiner

TIMEPIECE MOVEMENT COMPRISING A COUNTDOWN CHRONOGRAPH MECHANISM AND A STRIKING MECHANISM

CROSS-REFERENCE TO RELATED APPLICATIONS

This application is the U.S. national phase of International Application No. PCT/EP2021/060999 filed Apr. 27, 2021, which designated the U.S. and claims priority to EP Patent Application No. 20172014.1 filed Apr. 29, 2020, the entire contents of each of which are hereby incorporated by reference.

BACKGROUND OF THE INVENTION

Field of the Invention

The present invention relates to a mechanical timepiece movement comprising a chronograph mechanism arranged to be capable of carrying out at least one countdown of a predetermined time interval, comprising display means arranged to display at least the time remaining until the end of the countdown of said time interval, at least one member for controlling the start of the countdown, and a striking-mechanism.

Description of the Related Art

Such a movement is described, for example, in patent CH 704 705. A striking countdown mechanism is provided, making it possible to count down a predetermined period of time which can be adjusted up to 11:55 in jumps of five minutes. A control which can be actuated by a push-piece makes it possible to start the countdown. The end of the countdown is indicated by a mechanical striking-mechanism. The time remaining is given by two indicating disks for the hours and minutes.

SUMMARY OF THE INVENTION

The object of the present invention is to provide an improved mechanical timepiece movement with respect to the known striking countdown mechanism.

To this end, the present invention relates to a mechanical timepiece movement comprising a chronograph mechanism arranged to be capable of carrying out at least one countdown of a predetermined time interval, comprising display means arranged to display at least the time remaining until the end of the countdown of said predetermined time interval, at least one member for controlling the start of the countdown, and a striking-mechanism.

According to the invention, said striking-mechanism is arranged to start striking at a specified time before the end of the countdown and to stop striking at the end of said countdown of said predetermined time interval.

Thus, the invention makes it possible to trigger a striking-mechanism before the end of the countdown of said predetermined time interval in order to warn a user that the current countdown of the predetermined time interval is about to come to an end. Thus, the present invention makes it possible to have a countdown of a predetermined time interval having a pre-alarm using a mechanical striking-mechanism, and to be capable of synchronizing the end of the striking with the end of the countdown of said predetermined time interval.

Advantageously, the chronograph mechanism comprises at least one chronograph drive wheel and pinion arranged to be capable of performing a countdown, and in particular the countdown of the predetermined time interval, and the striking-mechanism comprises at least one first cam kinematically linked to said chronograph drive wheel and pinion and on which said specified time before the end of the countdown of said predetermined time interval is programmed, said first cam being arranged to make one revolution over a time greater than the specified time before the end of the countdown of said predetermined time interval, a striking geartrain, a first striking lever comprising a first striking feeler lever arranged to be capable of cooperating with said first cam and said striking geartrain in order to trigger the striking at the start of the specified time before the end of the countdown of said predetermined time interval and an end of striking mechanism arranged to be capable of cooperating with said first striking lever in order to control the stopping of the striking at the end of said specified time at the same time as the end of the countdown of said predetermined time interval.

The display means of the chronograph mechanism can preferably comprise a first display member associated with the first cam for displaying a countdown obtained via the chronograph drive wheel and pinion.

According to a first embodiment of the invention, the first display member is arranged to display a minute unit countdown.

According to a second particularly preferred embodiment of the invention, the first display member is arranged to display a second countdown.

According to the second embodiment, the display means of the chronograph mechanism can comprise a second minute unit display member arranged to display the minute unit countdown of said predetermined time interval and the striking-mechanism comprises a second minute unit cam associated with said second minute unit display member, and a third minute unit feeler lever arranged to be capable of cooperating with said second minute unit cam, said second minute unit cam being programmed to indicate the end of the minute unit countdown to the third minute unit feeler lever, said third minute unit feeler lever being arranged to cooperate with the first striking feeler lever such that said first striking feeler lever comes to cooperate with the first cam at the end of the minute unit countdown.

According to the second embodiment, the display means of the chronograph mechanism can comprise a third tens of minutes display member arranged to display the tens of minutes countdown of said predetermined time interval and the striking-mechanism comprises a third tens of minutes cam associated with said third tens of minutes display member, and a fourth tens of minutes feeler lever arranged to be capable of cooperating with said third tens of minutes cam, said third tens of minutes cam being programmed to indicate the end of the tens of minutes countdown to the fourth tens of minutes feeler lever, said fourth tens of minutes feeler lever being arranged to cooperate with the third minute unit feeler lever such that said third minute unit feeler lever comes to cooperate with said second minute unit cam at the end of the tens of minutes countdown.

According to the first embodiment, the display means of the chronograph mechanism can comprise a third tens of minutes display member arranged to display the tens of minutes countdown of said predetermined time interval and the striking-mechanism comprises a third tens of minutes cam associated with said third tens of minutes display member, and a fourth tens of minutes feeler lever arranged to be capable of cooperating with said third tens of minutes cam, said third tens of minutes cam being programmed to indicate the end of the tens of minutes countdown to the fourth tens of minutes feeler lever, said fourth tens of minutes feeler lever being arranged to cooperate with the first striking feeler lever such that said first striking feeler lever comes to cooperate with said first cam at the end of the tens of minutes countdown.

Regardless of the embodiment, the display means of the chronograph mechanism can comprise a fourth hour display member arranged to display the hour countdown of said predetermined time interval and the striking-mechanism comprises a fourth hour cam associated with said fourth hour display member, and a fifth hour feeler lever arranged to be capable of cooperating with said fourth hour cam, said fourth hour cam being programmed to indicate the end of the hour countdown to the fifth hour feeler lever, said fifth hour feeler lever being arranged to cooperate with the fourth tens of minutes feeler lever such that said fourth tens of minutes feeler lever comes to cooperate with said third tens of minutes cam at the end of the hour countdown.

Advantageously, the third minute unit feeler lever, the fourth tens of minutes feeler lever and the fifth hour feeler lever can form a single lever, optionally also with the first striking feeler lever.

The chronograph mechanism is preferably configured to be capable of being kinematically connected to a base movement by a lateral or vertical clutch device.

Advantageously, according to an embodiment, the end of striking mechanism comprises an end of striking lever comprising a second end of striking feeler lever arranged to be capable of cooperating with the first cam in order to control a disconnection of the clutch device and the stopping of the striking at the end of the countdown of said predetermined time interval.

According to this embodiment, the chronograph mechanism, and in particular the chronograph seconds-hand, stops automatically at the end of the countdown of the predetermined time interval.

According to another embodiment, the end of striking mechanism comprises an end of striking lever arranged to cooperate with the first striking lever and a stopping of striking cam kinematically linked to said chronograph drive wheel and pinion and arranged to control the end of striking lever in order to stop the striking at the end of the countdown of said predetermined time interval without disconnecting the clutch device.

According to this embodiment, the chronograph mechanism, and more particularly its chronograph drive wheel and pinion, remains activated after the end of the countdown of the predetermined time interval. Thus, the first display member, and more particularly the chronograph seconds-hand, continues turning without triggering striking. A manual stoppage by a user will be necessary to stop the chronograph mechanism.

BRIEF DESCRIPTION OF THE DRAWINGS

Other features and advantages of the present invention will become apparent on reading the following detailed description of different embodiments of the invention, provided by way of nonlimiting example, and with reference to the appended drawings, wherein.

DESCRIPTION OF THE PREFERRED EMBODIMENTS

Figure 1:
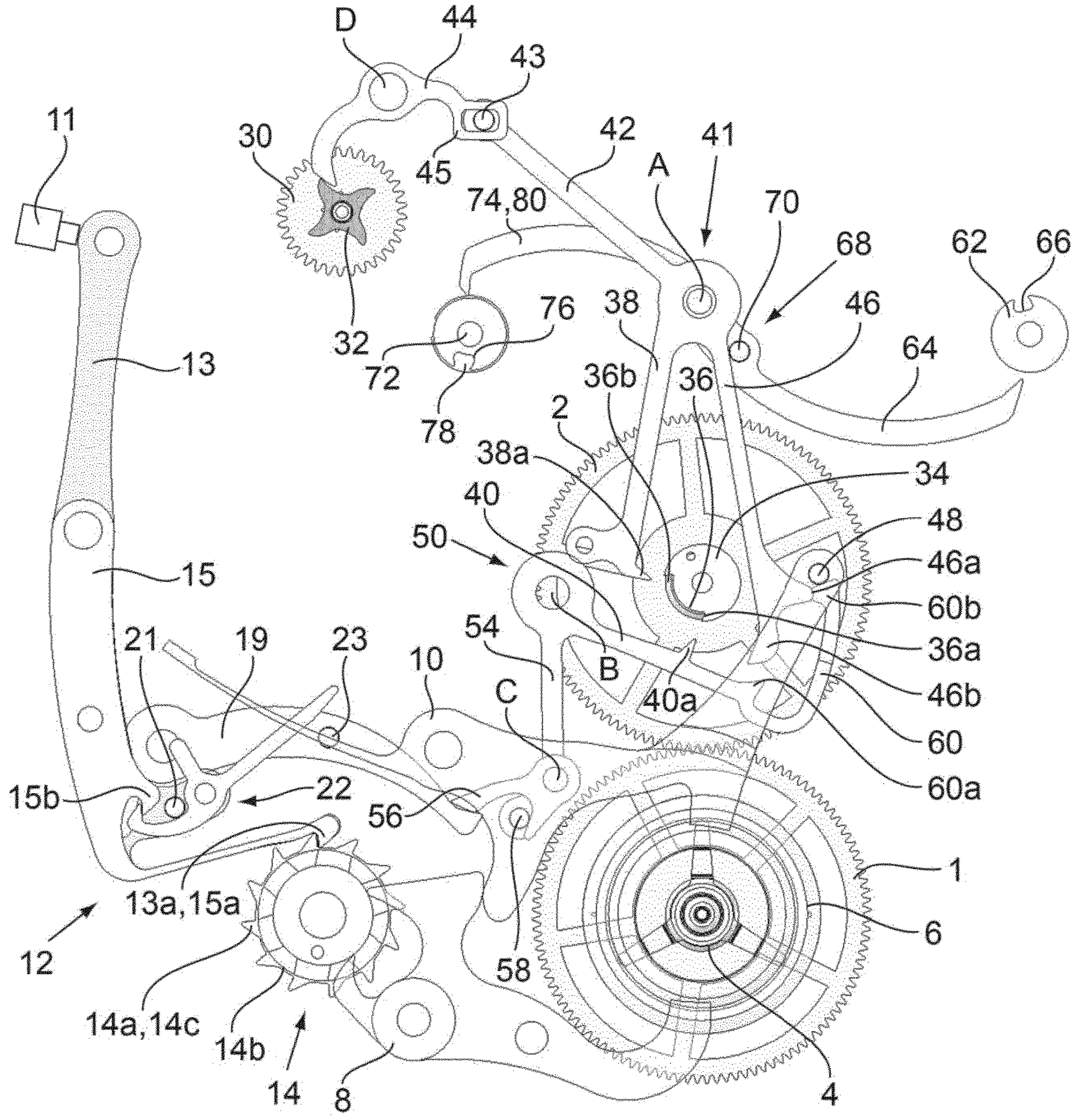
FIG. 1 shows a schematic view of a first embodiment of a movement according to the invention, the chronograph mechanism being in the STOP position.

With reference to FIG. 1, the present invention relates to a mechanical timepiece movement comprising a chronograph mechanism arranged to be capable of carrying out at least one countdown of a predetermined time interval. In the present description, the term "chronograph mechanism" should be considered in the broad sense of the term, that is to say as comprising all the necessary elements or components arranged to produce at least one countdown of time and fraction of time in order to perform at least one countdown.

The chronograph mechanism is shown here schematically by a chronograph drive wheel and pinion 1, a drive wheel 2 making one revolution per minute here, corresponding to a chronograph seconds-wheel, said drive wheel 2 being arranged to cooperate with the other components of the chronograph to be capable of performing a countdown and, in particular, a countdown of a predetermined time interval. The chronograph mechanism, and more particularly the chronograph drive wheel and pinion 1, is arranged to be capable of being kinematically connected to the seconds-wheel 4 of a base timepiece movement indicating the current time by a vertical clutch device 6. Said vertical clutch device 6 comprises a clutch control clamp 8 and a clutch clamp 10 arranged to move apart when the chronograph is activated in order to launch a countdown in such a way as to engage the seconds-wheel 4 and the chronograph drive wheel and pinion 1, making it possible to transmit energy from the base movement to the chronograph mechanism for its operation.

It is obvious that the clutch device could be lateral, with the construction of the movement being adapted by the person skilled in the art to this type of clutch.

The chronograph mechanism also comprises a member 11 for controlling the start of the countdown arranged to control at least the triggering of the chronograph mechanism, and in particular the opening of the clamps 8 and 10, via a control device 12 comprising a column wheel 14. This control member 11 is, for example, a push-piece. It can be arranged to also control the stopping of the chronograph mechanism, and in particular the closing of the clamps 8 and 10, during the countdown if necessary.

In the first embodiment of the invention according to FIGS. 1 to 9, the chronograph mechanism is arranged to be stopped automatically at the same time as the striking-mechanism.

To this end, the control device 12 advantageously comprises a main control 13 which can be actuated by the control member 11, and a secondary control 15 pivotally mounted on the main control 13 and to which it is linked by an elastic member (not shown). The main control 13 and secondary control 15 are respectively terminated by a hook 13*a*, 15*a*. The column wheel 14 comprises a first drive wheel 14*a* rigidly connected to the columns 14*b* and arranged to be actuated by the hook 15*a* of the secondary control 15, and a second drive wheel 14*c* arranged to be actuated by the hook 13*a* of the main control 13. The control device 12 also comprises a locking mechanism in rotation of the secondary control 15 on the main control 13, which is arranged to be capable of being controlled manually by the control member 11 as well as internally, automatically, by an internal control member, here the hook 56 of the end of striking lever 50 as will be described below.

The locking mechanism and the secondary control 15 are arranged to occupy a locked state in which the elastic member connecting the main control 13 and secondary control 15 is wound and the secondary control 15 is constrained to rotate with the main control 13 making it possible, during an actuation of the main control 13 via the actuating member 11, to simultaneously actuate the column wheel 14 by the main control 13 and secondary control 15, and to be capable of passing, in the event that the locking mechanism is actuated by the hook 56, into an unlocked state in which said secondary control 15 is detached from the main control 13 and actuates, alone, the column wheel 14, the elastic member unwinding, and to pass through a locking position, through an actuation of the main control 13, in which only the main control 13 actuates the column wheel 14, said main control 13 being arranged to rewind the elastic member and to cooperate with the locking mechanism of the secondary control 15 in order to return to the locked state.

The second drive wheel 14*c* is connected to the first drive wheel 14*a* by an elastic coupling element (not shown) arranged to link, in a manner constraining rotation, the second drive wheel 14*c* to the first drive wheel 14*a* when only the second drive wheel 14*c* is actuated by the hook 13*a* of the main control 13, if the secondary control 15 has passed to the unlocked state and then only the main control 13 is actuated during the next manual actuation via the control member 11, and in order to detach the second drive wheel 14*c* from the first drive wheel 14*a* when only the first drive wheel 14*a* is actuated, thanks to the energy supplied by the elastic member which unwinds, by the secondary control 15, after having been detached from the main control 13.

More particularly, the locking mechanism comprises a control lever 19 arranged to be controlled by the hook 56 in order to pass to the unlocked state and to be capable of cooperating with a pin 21 provided on the main control 13 in order to pass into the locking position then to the locked state. The locking mechanism also comprises a locking hook 22 carried by the main control 15 and arranged to be controlled by said control lever 19 via a pin 23 in order to pass to the unlocked state and to be capable of cooperating with a hook 15*b* provided on the secondary control 15 in order to pass into the locking position then to the locked state.

This control device of the chronograph mechanism makes it possible for it to be capable of being actuated by a user, but also by an internal control linked to the striking-mechanism, in such a way as to have an automatic control, in addition to a manual control of said chronograph mechanism, in order to stop the chronograph mechanism at the same time as the striking-mechanism.

Such a control device is described in greater detail in the applicant's European application No. EP 20171993.

Any other suitable control device known to the person skilled in the art can also be used.

In particular, it is possible to use a standard control device with a column wheel, controlled by a push-piece, in order to carry out the start/stop control of the chronograph mechanism manually and in a conventional manner, as will be described below in relation to another embodiment of the invention.

Notwithstanding the embodiments of the invention, the chronograph mechanism also comprises display means arranged to display at least the time remaining until the end of the countdown of the predetermined time interval. In the variant shown in FIG. 1, these display means comprise a first display member for displaying a second countdown and, in particular, the second countdown of the predetermined time interval, a second display member for displaying the minute unit countdown of the predetermined time interval, a third display member for displaying the tens of minutes countdown of the predetermined time interval and a fourth display member for displaying the hour countdown of the predetermined time interval.

These display means can be disks, hands, rollers or any other suitable display member for displaying the countdown of the hours, tens of minutes and minute units, as well as the seconds.

The first display member for the seconds is preferably a hand (not shown) corresponding to the seconds-hand.

Figure 11:
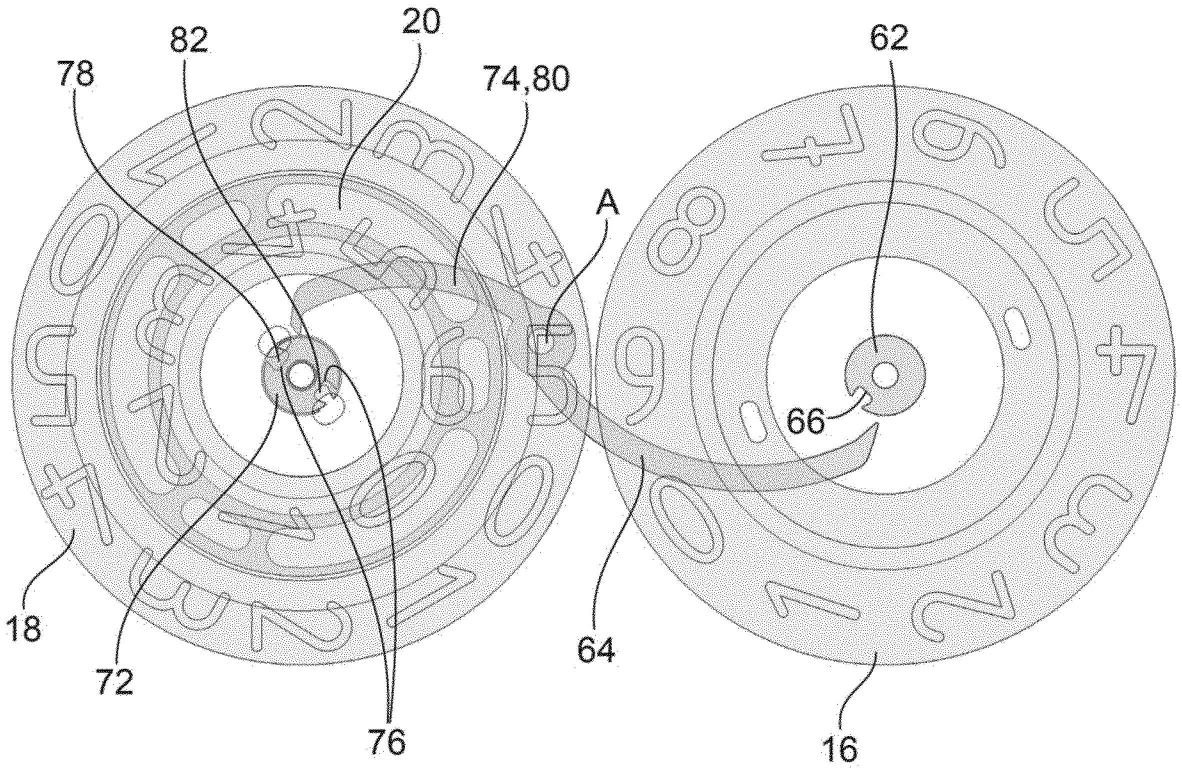
FIG. 11 shows a schematic view of the display members for hours, tens of minutes, and minute units.

FIG. 11 shows a preferred embodiment of the display members for displaying the countdown of the hours, tens of minutes and minute units of the predetermined time interval, used in the present invention in the form of disks, the first display member for the seconds being a hand (not shown) corresponding to the seconds-hand. More specifically, the second display member for counting down the minute units of the predetermined time interval is a disk 16 carrying the digits 0 to 9 regularly distributed on its periphery, said disk 16 being arranged to make one revolution in ten minutes. The third display member for counting down the tens of minutes of the predetermined time interval is a disk 18 disposed tangentially to the minute unit disk 16. The tens of minutes disk 18 carries two consecutive series of digits 0 to 5 regularly distributed on its periphery, said disk 18 being arranged to make one revolution in two hours. The fourth display member for counting down the hours of the predetermined time interval is a disk 20, disposed concentrically inside the tens of minutes disk 18. The hour disk 20 carries a series of digits 0 to 6 regularly distributed on its periphery, said disk 20 being arranged to make one revolution in seven hours. The centers of the three disks 16, 18 and 20 are aligned, making it possible to display the countdown of the hours, tens of minutes and minute units of the predetermined time interval in juxtaposed apertures to make it easy to read the countdown.

It is obvious that the display members for the hours, tens of minutes and minute units of the predetermined time interval can be arranged differently, the striking-mechanism being adapted accordingly, as will be described below.

The different display members can be arranged to be driven, one after the other, from the second to the hour, starting for example from the drive wheel 2. In another variant, the first display member for displaying the second countdown can be kinematically linked to the drive wheel 2 and an auxiliary energy source can be provided in order to supply energy to the display member for counting down the minute units, which drives the display member for counting down the tens of minutes, itself driving the display member for counting down the hours, for example by means of actuating fingers and stars which cooperate in order to cause the display member to jump corresponding to each tens of minutes or hour change.

An adjustment mechanism (not shown) is provided, which makes it possible to position, before the triggering of the countdown of the predetermined time interval, the different display members for counting down the hours 20, tens of minutes 18 and minute units 16 in such a way as to display the predetermined time interval to be counted down, said time interval to be counted down being adjustable for example up to 6:59.

Thus, when the countdown of the predetermined time interval is triggered, the different display members are arranged to display the time remaining which decreases as the countdown progresses, from the value of the predetermined time interval up to 0:00:00, in a very precise manner, down to the second.

Such a construction of a countdown chronograph mechanism cooperating with a base movement via a clutch device is known to the person skilled in the art and does not need to be described in greater detail.

The mechanical movement according to the invention also comprises a striking-mechanism made up of mechanical components and comprising, in particular, a striking geartrain shown here by an element 30 of the striking geartrain carrying a stopping star 32 of the striking geartrain. These components of a striking-mechanism are known to the person skilled in the art and do not need to be described in detail.

In accordance with the invention, the striking-mechanism is arranged so that the striking-mechanism starts striking at a specified time before the end of the countdown of the predetermined time interval, and stops striking at the end of the countdown, that is to say at the same time as the countdown of said predetermined time interval reaches 0:00:00.

To this end, the striking-mechanism comprises at least one first cam 34 kinematically linked to the chronograph drive wheel and pinion 1 and on which said specified time before the end of the countdown of said predetermined time interval is programmed, said first cam 34 being arranged to make one revolution over a time greater than the specified time before the end of the countdown of said predetermined time interval. The first cam 34 is associated with the first display member for displaying at least the countdown of said predetermined time interval obtained via the chronograph drive wheel and pinion 1. In the present example, the first cam 34 is the second cam, associated with the first display member (i.e., the seconds-hand) in order to display a second countdown. Here, the first cam 34 therefore makes one revolution per minute.

More particularly, the first cam 34 has a substantially circular profile and comprises a notch 36, the circular length of which corresponds to the specified time of the striking before the end of the countdown of the predetermined time interval, the start 36*a* of the notch 36 corresponding to the triggering of the striking, and the end 36*b* of the notch 36 corresponding to the stopping of the striking, at the same time as the stopping of the countdown of said predetermined time interval, as will be described in detail below. For example, the length of the notch 36, between the start 36*a* and the end 36*b* of said notch 36, can correspond to a time of 20 seconds before the end of the countdown of said predetermined time interval.

The striking-mechanism also comprises a first striking lever comprising a first striking feeler lever 38 arranged to be capable of cooperating with the first cam 34 and the striking geartrain in order to trigger the striking at the start of the specified time before the end of the countdown of said predetermined time interval.

The striking-mechanism also comprises an end of striking mechanism arranged to be capable of cooperating with said first striking lever in order to control the stopping of the striking at the end of said specified time at the same time as the end of the countdown of said predetermined time interval.

In the first embodiment of the invention according to FIGS. 1 to 9, in which the chronograph mechanism is arranged to be stopped automatically at the same time as the striking-mechanism, the first second cam 34 is carried by the drive wheel 2 which meshes with the chronograph drive wheel and pinion 1.

The first striking feeler lever 38 constitutes the first arm of a striking lever 41 pivotally mounted at A. The first striking feeler lever 38 has a beak 38*a* arranged to be capable of coming into contact with the first second cam 34 then of engaging in its notch 36 at the time of the striking, as will be described in greater detail below.

Said striking lever 41 comprises a second arm 42 arranged to control a stopping of striking lever 44 pivotally mounted at D, a pin 43 rigidly connected to the second arm 42 providing the link to said lever 44 via an oblong opening 45, said stopping of striking lever 44 itself being arranged to be capable of cooperating with the stopping star 32 of the striking geartrain. The striking lever 41 comprises a third arm 46 including a heel 46*a* arranged to be capable of cooperating with a pin 48 carried by the clutch clamp 10.

The operation of the different elements of the striking lever 41 will be described below.

The end of striking mechanism comprises an end of striking lever 50 pivotally mounted at B and provided with a second end of striking feeler lever 40 arranged to be capable of cooperating with the first cam 34 in order to control the stopping of the striking at the end of said specified time at the same time as the end of the countdown of said predetermined time interval. Thus, in this embodiment of the invention, the first cam 34 provided with its notch 36 is also part of the end of striking mechanism and constitutes both a start of striking cam and a stopping of striking cam.

The second end of striking feeler lever 40 constitutes the first arm of the end of striking lever 50.

More specifically, the second end of striking feeler lever 40 has a beak 40*a* arranged to be capable of coming into contact with the first second cam 34 when the first striking feeler lever 38 falls into the notch 36 of said first cam 34 in order to trigger the striking and in order to engage in said notch 36 at the end of the countdown and of the striking, as will be described in greater detail below.

The end of striking lever 50 comprises a second arm 54 carrying, at its free end, a hook 56 mounted pivotally at C and held in position by a pin 58 carried by the end of said second arm 54. The pivoting hook 56 is arranged to cooperate with the control device 12, as will be described below. In particular, the second end of striking feeler lever 40 is arranged to control, via said hook 56, a disconnection of the clutch device 6 and the stopping of the striking when said second end of striking feeler lever 40 falls into the notch 36 at the end of the countdown.

The end of striking lever 50 further comprises a third arm 60, in the extension of the second end of striking feeler lever 40. Said third arm 60 comprises a first beak 60*a* arranged to be capable of cooperating with the foot 46*b* of the third arm

46 of the striking lever 41 and a second beak 60*b* arranged to be capable of cooperating with the pin 48 of the clutch clamp 10.

The operation of the different elements of the end of striking lever 50 will be described below.

In the variant shown here, the striking-mechanism comprises a second minute unit cam 62 associated with the second minute unit display member 16 in order to make one revolution in ten minutes, for example, and a third minute unit feeler lever 64 arranged to be capable of cooperating with said minute unit cam 62, said minute unit cam 62 being programmed to indicate the end of the minute unit countdown to the third minute unit feeler lever 64. To this end, the minute unit cam 62 has a substantially circular profile and includes a notch 66, said third minute unit feeler lever 64 being arranged to be positioned in said notch 66 when the display members for the hours, tens of minutes and minute units all display 0, that is to say as of the moment when there is less than a minute to be counted down.

Furthermore, the third minute unit feeler lever 64 is arranged to cooperate with the first striking feeler lever 38 such that said first striking feeler lever 38 comes into contact with the first second cam 34 at the end of the minute unit countdown when the display members for the hours, tens of minutes and minute units all display 0.

More particularly, the third minute unit feeler lever 64 is a first arm of a detection lever 68 pivotally mounted at A, like the striking lever 41. The detection lever 68 and the striking lever 41 are arranged to be capable of cooperating with each other. To this end, the detection lever 68 comprises, on said third minute unit feeler lever 64, a pin 70 arranged to be in contact with the striking lever 41 and, for example, with its third arm 46, such that a pivoting at A of one of the detection 68 and striking 41 levers leads to a pivoting at A of the other of the detection 68 and striking 41 levers. In particular, a pivoting at A of the detection lever 68 in the anticlockwise direction moves the pin 70 away from the striking lever 41 such that said striking lever 41, released, can for its part pivot in the anticlockwise direction.

The striking-mechanism also comprises a third tens of minutes cam 72 associated with the third tens of minutes display member 18, and a fourth tens of minutes feeler lever 74 arranged to be capable of cooperating with said third tens of minutes cam 72, said third tens of minutes cam 72 being programmed to indicate the end of the tens of minutes countdown to the fourth tens of minutes feeler lever 74. To this end, the tens of minutes cam 72 has a substantially circular profile and can include, for example, two opposite notches 76 when the third tens of minutes display member 18 is arranged to make one revolution, with the tens of minutes cam 72, in two hours. The tens of minutes cam 72 can include only one notch 76 if the third tens of minutes display member is arranged to make one revolution per hour. The fourth tens of minutes feeler lever 74 is arranged to be positioned in one of the notches 76 when the display members for the hours 20 and tens of minutes 18 both display 0, that is to say as of the moment when there is less than ten minutes to be counted down.

Furthermore, the fourth tens of minutes feeler lever 74 is arranged to cooperate with the third minute unit feeler lever 64 such that said third minute unit feeler lever 64 comes to cooperate with the second minute unit cam 62 at the end of the tens of minutes countdown when the hour display member 20 and the tens of minutes display member 18 both display 0.

More particularly, the fourth tens of minutes feeler lever 74 is a second arm of the detection lever 68 opposite the third minute unit feeler lever 64 with respect to A such that a pivoting at A in the anticlockwise direction of the fourth tens of minutes feeler lever 74, falling into one of the notches 76 of the tens of minutes cam 72, leads to a pivoting at A, in the anticlockwise direction, of the third minute unit feeler lever 64 in order to come into contact with the minute unit cam 62.

The striking-mechanism also comprises a fourth hour cam 78 associated with the fourth hour display member 20, superposed on the third tens of minutes cam 72, and a fifth hour feeler lever 80, superposed on the fourth tens of minutes feeler lever 74, and arranged to be capable of cooperating with said fourth hour cam 78, said fourth hour cam 78 being programmed to indicate the end of the hour countdown to the fifth hour feeler lever 80. To this end, the fourth hour cam 78 has a substantially circular profile and includes a notch 82 (cf. FIGS. 4 and 5), the fifth hour feeler lever 80 being arranged to be positioned in the notch 82 when the hour display member 20 displays 0, that is to say as of the moment when there is less than an hour to be counted down.

The fourth hour display member 20 can be arranged to turn with the fourth hour cam 78 in such a way as to make it possible to count down six hours per revolution. The number of hours counted down can be different depending on the arrangement of the hour display member 20.

Furthermore, the fifth hour feeler lever 80 is arranged to cooperate with the fourth tens of minutes feeler lever 74 such that said fourth tens of minutes feeler lever 74 comes to cooperate with the third tens of minutes cam 72 at the end of the hour countdown when the hour display member 20 displays 0.

More particularly, the fifth hour feeler lever 80 is a third arm of the detection lever 68 such that a pivoting at A in the anticlockwise direction of the fifth hour feeler lever 80, falling into the notch 82 of the hour cam 78, leads to a pivoting at A, in the anticlockwise direction, of the fourth tens of minutes feeler lever 74 in order to come into contact with the tens of minutes cam 72.

This means that, in this particularly preferred variant of the invention, the third minute unit feeler lever 64, the fourth tens of minutes feeler lever 74 and the fifth hour feeler lever 80 form a single lever, namely the detection lever 68. It is obvious that other arrangements of these levers are possible, selected such that said levers pivot in the same direction. In particular, the different feeler levers can be separated while being arranged so that when one pivots in one direction, the others pivot in the same direction.

All the elements such as return-bars, levers, controls, clamps, hooks of the different mechanisms described above are subject to their own return springs (not shown).

The operation of the movement is as follows: the initial STOP position in which the control device 12 is ready to operate is shown in FIG. 1. The secondary control 15 and the locking mechanism are in the locked state, the locking hook 22 being coupled to the hook 15*b* of the secondary control 15. The secondary control 15 is therefore locked in rotation with the main control 13, the elastic member connecting them being wound. In this STOP position, the countdown chronograph mechanism and the striking-mechanism are inactive. It is considered that the different display members for the hours 20, tens of minutes 18, minute units 16 and seconds have been positioned in order to display the predetermined time interval for the countdown. Only the seconds-wheel 4 of the base timepiece movement turns.

Figure 2:
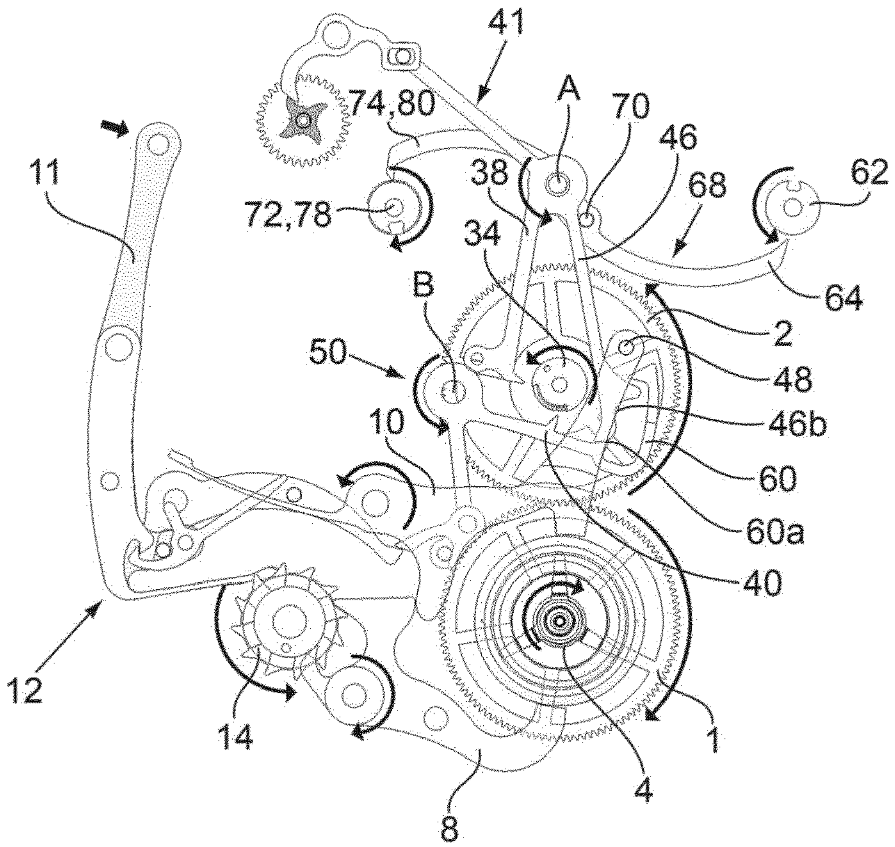
FIGS. 2 to 9 show schematic views of the movement of FIG. 1 in different positions between a countdown start and a countdown end, the control device being ready to operate.

With reference to FIG. 2, the control member 11 of the control device 12 is pushed by a user in order to trigger the START such that the column wheel 14 turns in such a way as to open the clutch control clamp 8 and the clutch clamp 10 in order to engage the seconds-wheel 4 and the chronograph drive wheel and pinion 1. The opening of the clutch clamp 10 releases the striking lever 41 and the end of striking lever 50, their respective arms 46 and 60 no longer being retained by the pin 48 of the clutch clamp 10. The striking lever 41 pivots around A in the anticlockwise direction, making it possible for the detection lever 68 to pivot in the anticlockwise direction, such that the first striking feeler lever 38, the third minute unit feeler lever 64, and the fourth tens of minutes feeler lever 74, which were at a distance from their respective cams 34, 62, 72 in order to make it possible to adjust the display members 16, 18 for the countdown, pivot in the anticlockwise direction and slightly approach their respective cams 34, 62, 72. The fifth hour feeler lever 80, which was also at a distance from its hour cam 78 in order to make it possible to adjust the hour display member 20 for the countdown, pivots in the anticlockwise direction until it comes into contact with its hour cam 78.

Similarly, the released end of striking lever 50 pivots around B in the anticlockwise direction such that the second end of striking feeler lever 40 also slightly approaches the second cam 34. The end of striking lever 50 is held in position by the foot **46*b* of the third arm 46 of the striking lever 41 resting on the first beak 60*a* of its third arm 60**.

The chronograph drive wheel and pinion 1, engaged with the seconds-wheel 4, drives the drive wheel 2 and the first second cam 34 in the anticlockwise direction. The display members for the hours 20, tens of minutes 18 and minute units 16 are also driven with, respectively, the hour cam 78, the tens of minutes cam 72 and the minute unit cam 62 each time the seconds-hand carried by the drive wheel 2 moves to 0.

Figure 3:
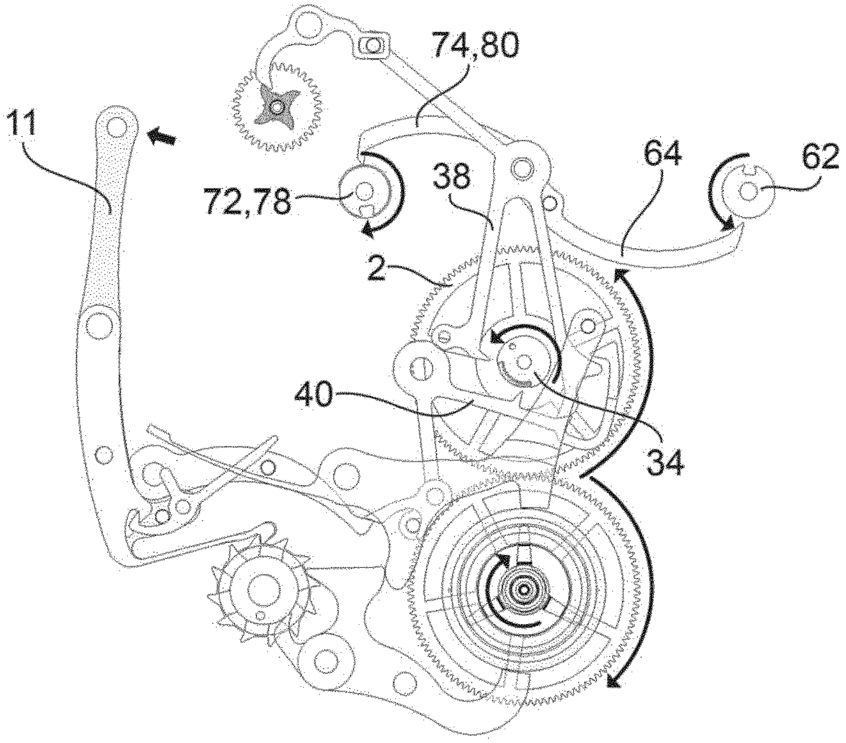

With reference to FIG. 3, the START phase is terminated by the return of the control member 11 to its initial position as a result of the action of its return spring (not shown). The countdown is in progress. The drive wheel 2 and the second cam 34 turn in the anticlockwise direction such that the display members for the hours 20, tens of minutes 18 and minute units 16 with their respective cams 62, 72, 78 are released and can turn, depending on the countdown to be displayed, each time the seconds-hand moves to 0, as in a standard countdown. The fifth hour feeler lever 80 is in contact with its hour cam 78, the other feeler levers 38, 40, 64 and 74 remaining at a distance from their cams 34, 62, 72.

Figure 4:
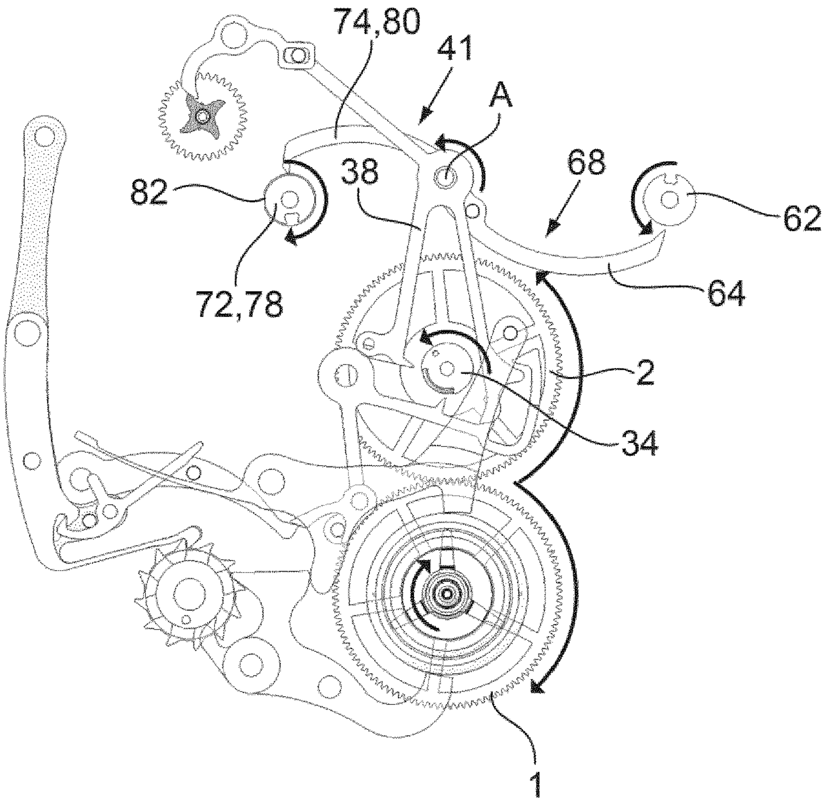

With reference to FIG. 4, when there is less than an hour to be counted down, the hour display member 20 is positioned in order to display 0 such that the hour feeler lever 80, being in contact with the hour cam 78, engages in the notch 82 of said hour cam 78 by pivoting at A in the anticlockwise direction. The pivoting of the hour feeler lever 80 means the pivoting at A in the anticlockwise direction of the detection lever 68 and, therefore, of the tens of minutes feeler lever 74 which comes into contact with the tens of minutes cam 72 and the minute unit feeler lever 64 which approaches its cam 62, as well as the pivoting at A in the anticlockwise direction of the striking lever 41 and, therefore, of the striking feeler lever 38 which approaches the second cam 34. The countdown continues via the drive wheel 2 driven by the chronograph drive wheel and pinion 1.

Figure 5:
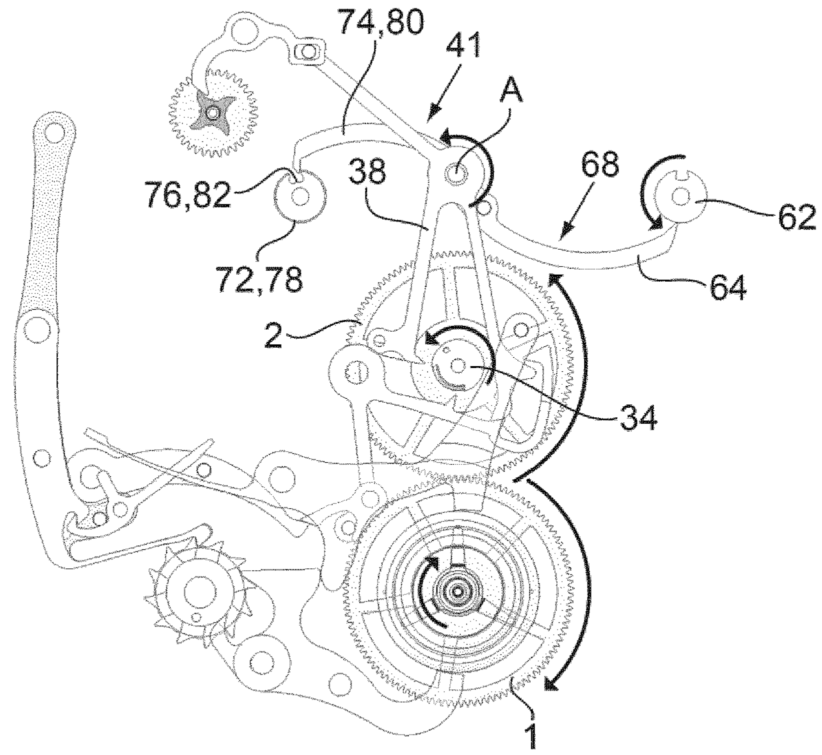

With reference to FIG. 5, when there are less than ten minutes to be counted down, the hour display member 20 still displaying 0, the tens of minutes display member 18 is positioned in order to display 0 such that the tens of minutes feeler lever 74, being in contact with the tens of minutes cam 72, engages in the notch 76 of said tens of minutes cam 72 by pivoting at A in the anticlockwise direction. The pivoting of the tens of minutes feeler lever 74 means the pivoting at A in the anticlockwise direction of the detection lever 68 and, therefore, of the minute unit feeler lever 64 which comes into contact with the minute unit cam 62, as well as the pivoting at A in the anticlockwise direction of the striking lever 41 and, therefore, of the striking feeler lever 38 which approaches the second cam 34. The hour display member 20 having remained in the position displaying 0, the hour feeler lever 80 remains engaged in the notch 82 of the hour cam 78. The countdown continues via the drive wheel 2 driven by the chronograph drive wheel and pinion 1.

Figure 6:
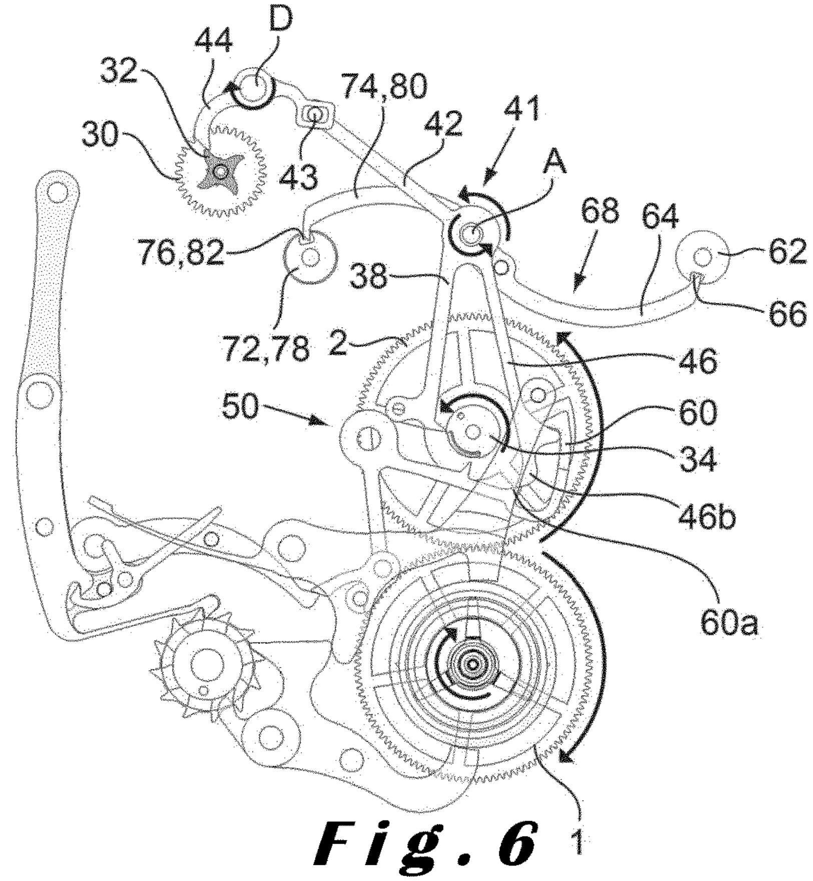

With reference to FIG. 6, when there is less than a minute to be counted down, the display members for the hours 20 and tens of minutes 18 still displaying 0, the minute unit display member 16 is positioned in order to display 0 such that the minute unit feeler lever 64, being in contact with the minute unit cam 62, engages in the notch 66 of said minute unit cam 62 by pivoting at A in the anticlockwise direction. The pivoting of the minute unit feeler lever 64 means the pivoting at A in the anticlockwise direction of the detection lever 68 and, therefore, the pivoting at A in the anticlockwise direction of the striking lever 41 and, therefore, of the striking feeler lever 38 which comes into contact with the second cam 34 linked to the drive wheel 2. The display members for the hours 20 and tens of minutes 18 having remained in the position displaying 0, the hour feeler lever 80 remains engaged in the notch 82 of the hour cam 78, and the tens of minutes feeler lever 74 remains engaged in the notch 76 of the tens of minutes cam 72. With the pivoting of the striking lever 41 and its arm 42, the stopping of striking lever 44 is arranged to start to free itself from the stopping star 32 by pivoting in the clockwise direction around its pivot D, and the foot **46*b* of the third arm 46 of the striking lever 41 is practically freed from the first beak 60*a* of the third arm 60 of the end of striking lever 50. The countdown continues via the drive wheel 2 driven by the chronograph drive wheel and pinion 1 such that the second display member continues to turn in the anticlockwise direction with the second cam 34**.

Figure 7:
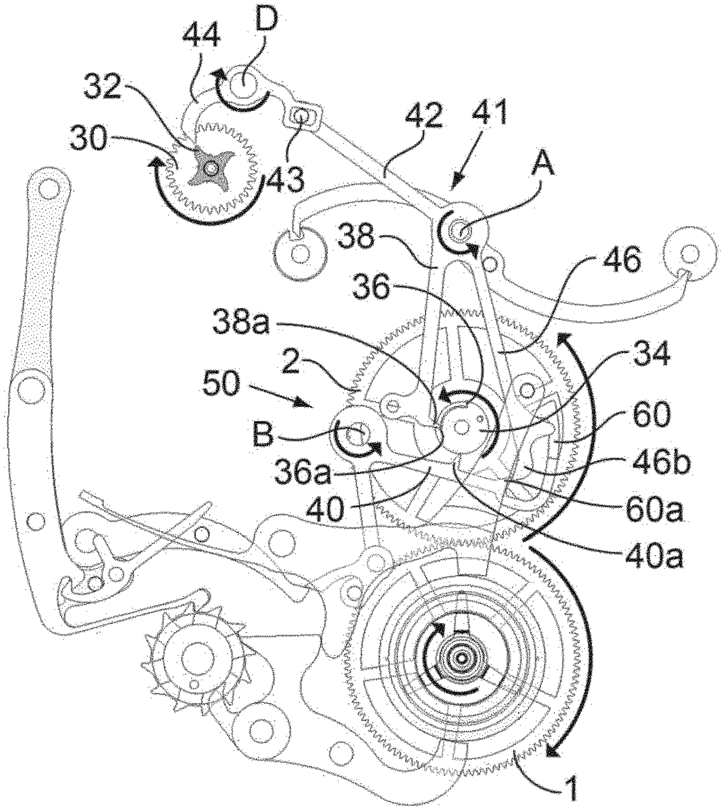

With reference to FIG. 7, the display members for the hours 20, tens of minutes 18 and minute units 16 still displaying 0, when the second display member displays the specified time before the end of the countdown, for example 20 seconds, the second cam 34 is positioned such that the beak **38*a* of the striking feeler lever 38, being in contact with the second cam 34, engages in the start 36*a* of the notch 36 of said second cam 34 by pivoting at A in the anticlockwise direction. The pivoting of the striking feeler lever 38 means the pivoting at A in the anticlockwise direction of the striking lever 41 and, in particular, of its arm 42 such that the stopping of striking lever 44 frees itself from the stopping star 32 by pivoting in the clockwise direction around its pivot D, and releases it. The element 30** of the striking geartrain being released, the striking-mechanism starts striking at the specified time before the end of the countdown.

Thus, the pivoting in the anticlockwise direction of the hour feeler lever 80, then of the tens of minutes feeler lever 74, then of the minute unit feeler lever 64, when it engages in the notch of its respective cam means the pivoting at A of the detection 68 and striking levers 41 assembly in the anticlockwise direction such that said feeler levers gradually approach their respective cams until they come into contact with their respective cams in order to be capable of engaging in the associated notch when their respective display members display zero, and such that the striking feeler lever 38 also gradually approaches the second cam 34 until it comes into contact with said second cam 34 in order to be capable of falling into the notch 36 when the countdown reaches the specified time before the end of the countdown in order to trigger the striking.

In parallel, the third arm 46 of the striking lever 41 has also pivoted at A such that its foot 46*b* frees itself completely from the first beak 60*a* of the third arm 60 of the end of striking lever 50. The end of striking lever 50 is then released and pivots in the anticlockwise direction around B such that the beak 40*a* of the end of striking feeler lever 40 comes into contact with the second cam 34.

The display members for the hours 20, tens of minutes 18 and minute units 16 having remained in the position displaying 0, the hour feeler lever 80 remains engaged in the notch 82 of the hour cam 78, the tens of minutes feeler lever 74 remains engaged in the notch 76 of the tens of minutes cam 72, and the minute unit feeler lever 64 remains engaged in the notch 66 of the minute unit cam 62. The countdown continues via the drive wheel 2 driven by the chronograph drive wheel and pinion 1 such that the second display member continues turning in the anticlockwise direction with the second cam 34.

Figure 8:
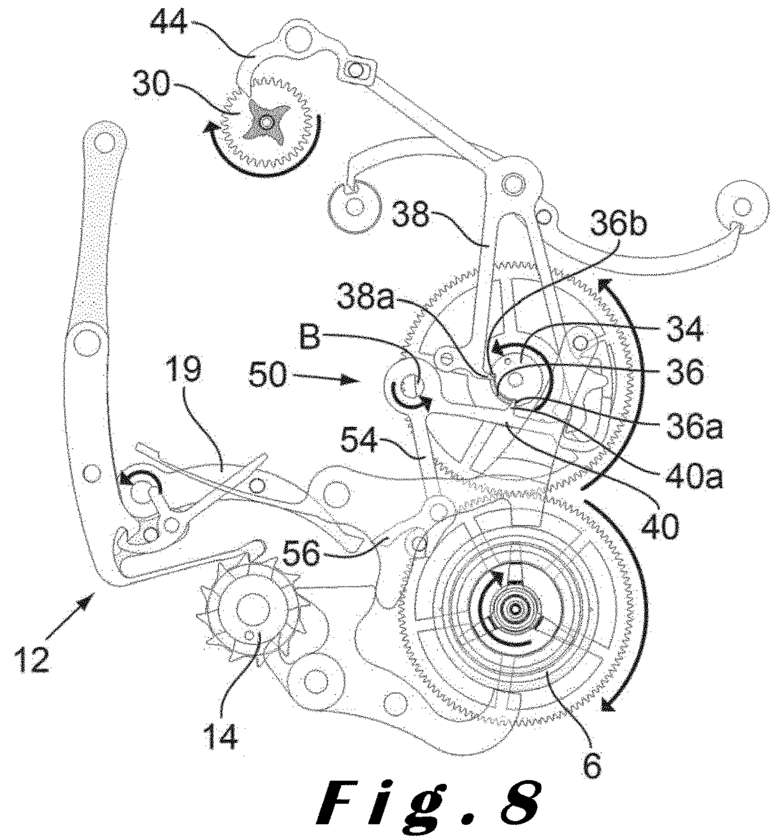

With reference to FIG. 8, when the countdown ends and reaches zero, the display members for the hours 20, tens of minutes 18 and minute units 16 still displaying 0, the second display member is positioned with the second cam 34 in order to display 0, the striking still being in progress. The circular length of the notch 36 of the second cam 34 is such that when the 0 is displayed at the end of the countdown, the beak 40*a* of the end of striking feeler lever 40, being in contact with the second cam 34, engages in the start 36*a* of the notch 36 of said second cam 34 by pivoting at B in the anticlockwise direction. The beak 38*a* of the striking feeler lever 38 has reached the end 36*b* of the notch 36.

The pivoting of the end of striking feeler lever 40, having fallen into the notch 36 of the second cam 34 at the end of the countdown, means the pivoting at B in the anticlockwise direction of the end of striking lever 50 and, in particular, of its arm 54 such that the hook 56 carried by the arm 54 releases the control lever 19 in order to act on the control device 12 in order to control a rotation of the column wheel 14 in order to disengage the clutch device 6.

Figure 9:
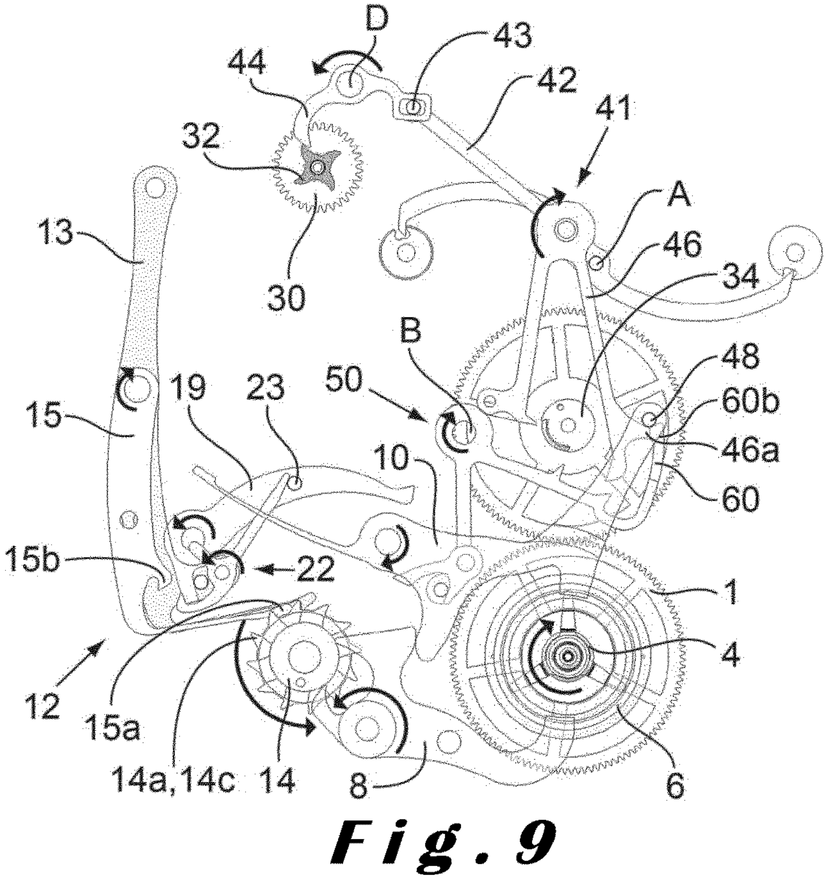

With reference to FIG. 9, the control lever 19, released, pivots sufficiently so that its pin 23 comes, during its travel, to cooperate with the locking hook 22 in such a way as to cause it to pivot in the anticlockwise direction. The locking hook 22 having separated from the hook 15*b* of the secondary control 15 then passes to the unlocked state. The secondary control 15 is then also in the unlocked state, disconnected from the main control 13 such that, thanks to the energy supplied by the elastic member which is unwinding, said secondary control 15, released, only pivots in the clockwise direction by activating, by its hook 15*a*, the first drive wheel 14*a* of the column wheel 14 in the anticlockwise direction. This corresponds to an automatic STOP, during the course of which the column wheel 14 is actuated automatically solely by the secondary control 15, the main control 13 and the second drive wheel 14*c* having remained stationary, and the elastic coupling element between the two drive wheels 14*a*, 14*c* having disengaged.

The rotation of the column wheel 14 controls the closing of the clutch clamps 8 and 10 in such a way as to disengage the seconds-wheel 4 and the chronograph drive wheel and pinion 1, which leads to the stopping of the drive wheel 2 and the second cam 34. During the closing of the clutch clamp 10, the pin 48 of said clutch clamp 10 returns to its initial position by resting on the heel 46*a* of the arm 46 of the striking lever 41 and on the beak 60*b* of the arm 60 of the end of striking lever 50, such that said striking lever 41 and end of striking lever 50, and more particularly the striking feeler lever 38 and the end of striking feeler lever 40, pivot respectively at A and B in the clockwise direction and are freed from the second cam 34. With this pivoting of the striking lever 41, and therefore of its arm 42, at the same time as the disengagement of the chronograph mechanism, the stopping of striking lever 44 pivots in the anticlockwise direction around its pivot D in order to again come to cooperate with the stopping star 32 and to stop the element 30 of the striking geartrain. Thus, the striking is stopped at the same time as the end of the countdown.

For a next countdown, the display members 16, 18, 20 will again be positioned depending on the predetermined time interval for the countdown and the control device 12 is arranged to be positioned in a position ready to operate at the time of the next START. More particularly here, the automatic function of the secondary control 15 is made operational again for the next use of the chronograph, thanks to the locking mechanism passing into its locking position when the next START is triggered after the user again presses the control member 11, before returning to the locked state. Indeed, when a user triggers a new START, the secondary control 15 being in its unlocked state, only the main control 13 tilts in order to actuate the column wheel 14, its hook 13*a* actuating the second drive wheel 14*c*, itself driving the first drive wheel 14*a*, and therefore the columns 14*b*, via the coupling produced by the elastic coupling element, as described above, in order to control a new opening of the clamps 8 and 10.

In parallel, by tilting, the main control 13 makes it possible to rewind the elastic member connecting it to the secondary control 15. On the other hand, when the main control 13 tilts, its pin 21 comes, during its travel, to cooperate with the control lever 19 in such a way as to cause it to pivot into the locking position, retracting the hook 56. When it is pivoted, the control lever 19 is rewound. At the same time, the locking hook 22, embedded in the main control 13, comes back into contact with the hook 15*b* of the secondary control 15, causing it to be freed in the anticlockwise direction in order to pass into the locking position. At the end of the tilting of the main control 13, the locking hook 22 returns to engage in the hook 15*b* of the secondary control 15 in order to pass into the locked state again. The elastic member between the main control 13 and the secondary control 15 is completely rewound.

It is of course possible to make a STOP & START during the countdown.

It is possible to provide a similar mechanism by removing the display of the hours and the elements linked to the hour countdown if only a countdown of the minutes and seconds is desired.

It is also possible, according to another embodiment, to not count down the seconds and to have a first display member arranged to display a minute unit countdown, the first cam 34 linked to the first display member then being arranged to make one revolution in ten minutes and the circular length of its notch being able to be selected in order to trigger the striking a few minutes before the end of the countdown.

In this case, it is considered that the first and second display members coincide, the first and second cams coincide and a third tens of minutes display member is provided, which is arranged to display the tens of minutes countdown as described above. The striking-mechanism then comprises a third tens of minutes cam associated with said third tens of minutes display member, and a fourth tens of minutes feeler lever arranged to be capable of cooperating with said third tens of minutes cam, said third tens of minutes cam being programmed to indicate the end of the tens of minutes countdown to the fourth tens of minutes feeler lever, said fourth tens of minutes feeler lever being arranged to cooperate directly with the first striking feeler lever, coincides with the minute unit feeler lever such that said first striking feeler lever comes to cooperate with said first cam at the end of the tens of minutes countdown. The rest of the mechanism is identical to that described above.

Figure 10:
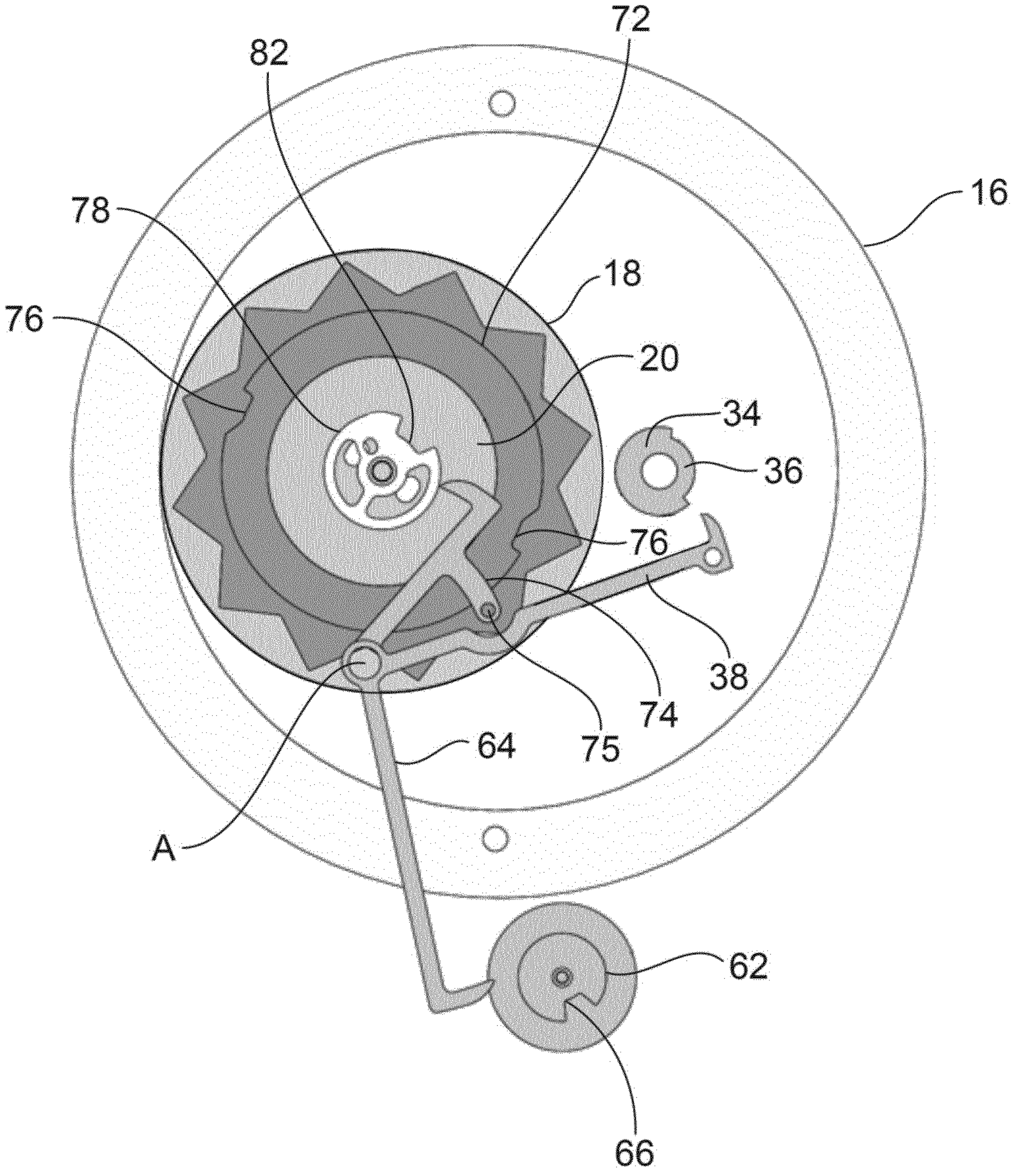
FIG. 10 shows a schematic view of a second embodiment of a movement according to the invention.

FIG. 10 shows a variant of the movement according to the invention, in which the first striking feeler lever 38, the third minute unit feeler lever 64, the fourth tens of minutes feeler lever 74 and the fifth hour feeler lever 80 form one single lever.

The first striking feeler lever 38 is also rigidly connected to two other arms, not shown, corresponding to the arms 42 and 46 of the first example such that the entire assembly can form one single lever.

The functional elements identical to the elements of the movement in FIG. 1 are shown with the same reference numerals.

In the variant shown in FIG. 10, the second cam 34 linked to the second display member and to the drive wheel 2 is provided. The second cam 34 comprises the notch 36 defining the specific striking time before the end of the countdown. The minute unit display member 16 associated with the minute unit cam 62 including its notch 66, the tens of minutes display member 18 associated with the tens of minutes cam 72 including its two notches 76, and the hour display member 20 associated with the hour cam 78 including its notch 82, are also provided.

The hour feeler lever 80 is arranged to be capable of cooperating with the hour cam 78 and of falling into the notch 82 when the hour display member 20 displays zero. Said hour feeler lever 80 carries, on its arm, the tens of minutes feeler lever 74, disposed substantially perpendicular to the hour feeler lever 80. The tens of minutes feeler lever 74 carries, at its end, a pin 75 arranged to come into contact substantially tangentially with the tens of minutes cam 72 and to fall into one of the notches 76 when the tens of minutes display member 18 displays zero. The minute unit feeler lever 64 is arranged to be capable of cooperating with the minute unit cam 62 and of falling into the notch 66 when the minute unit display member 16 displays zero. The striking feeler lever 38 is arranged to be capable of cooperating with the second cam 34 and of falling into the notch 36 when the countdown reaches the specified time before the end of the countdown in order to trigger the striking.

The striking feeler lever 38, the minute unit feeler lever 64 and the hour feeler lever 80 are rigidly connected to each other by their opposite ends to their feelers in such a way as to form the different arms of one single lever pivotally mounted at A. Thus, as described above, the pivoting in the anticlockwise direction of the hour feeler lever 80, then of the tens of minutes feeler lever 74, then of the minute unit feeler lever 64, when it engages in the notch of its respective cam means the pivoting of the lever assembly in the anticlockwise direction such that said feeler levers gradually approach their respective cams until they come into contact with their respective cams in order to be capable of engaging in the associated notches when their respective display members display zero, and such that the striking feeler lever 38 also gradually approaches the second cam 34 until it comes into contact with said second cam 34 in order to be capable of falling into the notch 36 when the countdown reaches the specified time before the end of the countdown in order to trigger the striking.

The end of striking lever (not shown) is identical to the lever 50 of the first example.

In another embodiment of the invention according to FIGS. 12 to 21, the chronograph mechanism is arranged so that the first second display member, that is to say the chronograph seconds-hand, continues turning after the automatic stopping of the striking and after the end of the countdown of the predetermined time interval.

The elements common to the embodiment in FIGS. 1 to 9 are shown with the same reference numerals.

Said chronograph drive wheel and pinion 1 is arranged to be capable of being kinematically connected to the seconds-wheel 4 of the base timepiece movement indicating the current time by the vertical clutch device 6. Said vertical clutch device 6 comprises a clutch control clamp 8 and a clutch clamp 10 arranged to move apart when the chronograph is activated in order to launch a countdown in such a way as to engage the seconds-wheel 4 and the chronograph drive wheel and pinion 1. The opening of the clamps 8 and 10 is controlled in the traditional manner by a standard control device with a column wheel 14, actuated for example by a button of the push-piece 11 type, in order to carry out the start/stop control of the chronograph mechanism manually and in the conventional manner.

The display means arranged to display the hour, tens of minutes and minute units remaining until the end of the countdown of the predetermined time interval are similar to those described previously.

Only the minute unit cam 62 with its notch 66, associated with the minute unit display member, the minute unit feeler lever 64 mounted pivotally at G, the tens of minutes cam 72 with its notches 76, associated with the tens of minutes display member, the tens of minutes feeler lever 74, the hour cam 78 with its notch 82, associated with the hour display member, superposed on the tens of minutes cam 72, and the hour feeler lever 80, superposed on the tens of minutes feeler lever 74, are shown.

The tens of minutes feeler lever 74 and the hour feeler lever 80 form the arms of a detection lever 90 pivotally mounted at H, as in the case of the detection lever 68 of the first embodiment. In this embodiment, the detection lever 90 comprises a third arm 92 opposite the tens of minutes feeler lever 74 with respect to H, such that a pivoting at H in the clockwise direction of the tens of minutes feeler lever 74, falling into one of the notches 76 of the tens of minutes cam 72, leads to a pivoting at H, in the clockwise direction, of the third arm 92 of the detection lever 90. At the end of the third arm 92 of the detection lever 90, there is provided a pin 94 which is arranged to cooperate with a beak 96 of the minute unit feeler lever 64. Thus, a pivoting at H in the clockwise direction of the detection lever 90 and its arm 92 leads to a pivoting at G, in the anticlockwise direction, of the third minute unit feeler lever 64 in order to come into contact with the minute unit cam 62.

As in the first embodiment above, the minute unit feeler lever 64 is arranged to be positioned in the notch 66 of the minute unit cam 62 when the display members for the hours, tens of minutes and minute units all display 0, that is to say as of the moment when there is less than a minute to be counted down.

The striking-mechanism comprises the first second cam 34. In this embodiment, the construction of the mechanism is realized such that the first second cam 34 and the first display member for displaying a second countdown, that is to say the chronograph seconds-hand, are carried directly by the axis of the chronograph drive wheel and pinion 1.

Figure 12:
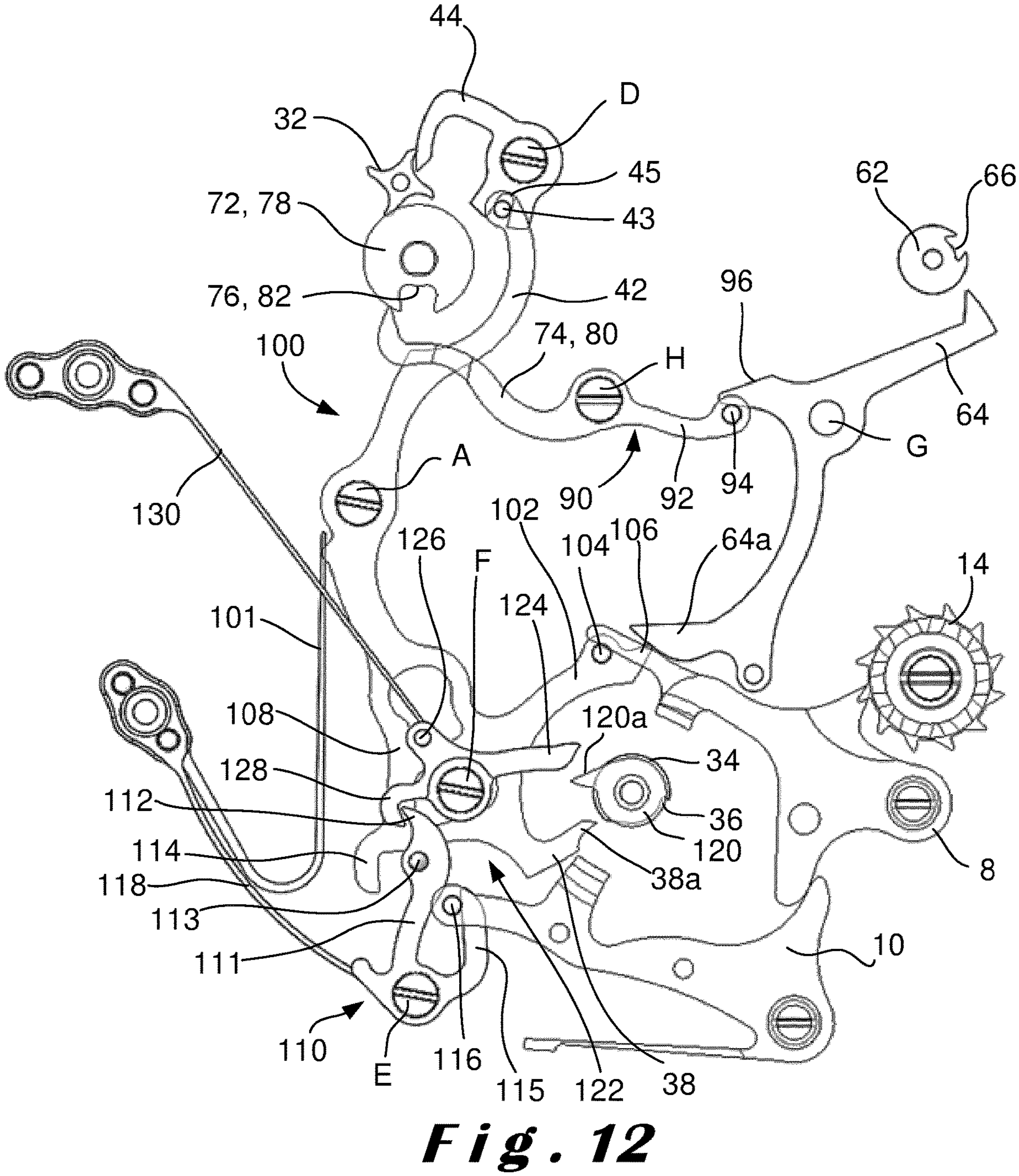
FIG. 12 shows a schematic view of another embodiment of a movement according to the invention, the chronograph mechanism being in the STOP position before the start of a countdown of a predetermined time interval.

With reference to FIG. 12, the second cam 34 comprises the notch 36, the circular length of which corresponds to the specified time of the striking before the end of the countdown of the predetermined time interval, the start of the notch 36 corresponding to the triggering of the striking, and the end of the notch 36 corresponding to the stopping of the striking. For example, the length of the notch 36 can correspond to a time of 20 seconds before the end of the countdown of said predetermined time interval.

The striking-mechanism also comprises a first striking lever 100 pivotally mounted at A and comprising a first arm made up of the first striking feeler lever 38 arranged to be capable of cooperating with the first cam 34 and the striking geartrain in order to trigger the striking at the start of the specified time before the end of the countdown of said predetermined time interval.

More specifically, the first striking feeler lever 38 has a beak 38*a* arranged to be capable of coming into contact with the first second cam 34, then of engaging in its notch 36 at the moment of the striking. The striking lever 100 is subject to its spring 101.

As in the first embodiment, said striking lever 100 comprises a second arm 42 arranged to control the stopping of striking lever 44 pivotally mounted at D, a pin 43 rigidly connected to the second arm 42 providing the link with said lever 44 via an oblong opening 45, said stopping of striking lever 44 itself being arranged to be capable of cooperating with the stopping star 32 of the striking geartrain.

The striking lever 100 comprises a third arm 102 carrying a pin 104 arranged to be capable of cooperating with the clutch control clamp 8. More specifically, the clutch control clamp 8 rests on the pin 104 when it is in a closed position.

Furthermore, the third minute unit feeler lever 64 is arranged to cooperate with the first striking feeler lever 38, via the third arm 102 of the striking lever 100, such that the beak 38*a* of the first striking feeler lever 38 comes into contact with the first second cam 34 at the end of the minute unit countdown when the display members for the hours, tens of minutes and minute units all display 0.

More particularly, the minute unit feeler lever 64 includes a foot 64*a* arranged in order to rest on a beak 106 of the third arm 102 of the striking lever 100 in such a way as to retain the first striking feeler lever 38 at a distance from the second cam 34 until the end of the minute unit countdown.

The striking lever 100 comprises a fourth arm 108 arranged to be capable of cooperating with the end of striking mechanism in order to control the automatic stopping of the striking at the end of said specified time at the same time as the end of the countdown of said predetermined time interval.

To this end, the end of striking mechanism comprises an end of striking lever 110 pivotally mounted at E, and arranged to cooperate with the first striking lever 100. More specifically, the end of striking lever 110 comprises a first arm 111 terminated by a beak 112 and carrying a pin 113 arranged to cooperate with the end 114 in the form of a hook of the fourth arm 108 of the first striking lever 100. The end of striking lever 110 comprises a second arm 115 arranged to cooperate with a pin 116 carried by the clutch clamp 10. The end of striking lever 110 is subject to its spring 118.

The end of striking mechanism also comprises a stopping of striking cam 120 kinematically linked to said chronograph drive wheel and pinion 1 and arranged to control the end of striking lever 110, and therefore the first striking lever 100, in order to automatically stop the striking at the end of the countdown of said predetermined time interval, and does so without disconnecting the clutch device 6.

Advantageously, the stopping of striking cam 120 is coaxial to the second cam 34 and constrained to rotate with the latter. It comprises a beak 120*a*.

In order to be capable of controlling the end of striking lever 110 via the stopping of striking cam 120 in order to automatically stop the striking, the end of striking mechanism comprises a lever hook 122 mounted pivotally at F, its pivot axis passing through the striking lever 100 by means of an opening provided for this purpose. Said lever hook 122 comprises a first arm 124 arranged to be capable of cooperating with the beak 120*a* of the stopping of striking cam 120 and a pin 126 arranged to cooperate with the fourth arm 108 of the first striking lever 100 in order to cause the lever hook 122 to pivot at F in such a way as to position its arm 124 in the radius of gyration of the beak 120*a* of the stopping of striking cam 120 when the first striking lever 100 pivots at A in the anticlockwise direction in order to bring the beak 38*a* of the first striking feeler lever 38 into contact with the first second cam 34.

The lever hook 122 comprises a second arm 128 in the form of a hook arranged to cooperate with the beak 112 of the end of striking lever 110 in order to lock said end of striking lever 110 and to be capable of releasing it when said lever hook 122 is actuated by the stopping of striking cam 120.

The lever hook 122 is subject to its spring 130.

The operation of the mechanism according to this embodiment is as follows: the initial STOP position in which the countdown chronograph mechanism and the striking-mechanism are inactive is shown in FIG. 12. It is considered that the different display members for the hours, tens of minutes, minute units and seconds have been positioned to display the predetermined time interval for the countdown. Only the seconds-wheel 4 of the base timepiece movement turns.

The control member of the control device is pushed by a user in order to trigger the START such that the column wheel 14 turns in such a way as to open the clutch control clamp 8 and the clutch clamp 10 in order to engage the seconds-wheel 4 and the chronograph drive wheel and pinion 1.

When the clutch clamp 10 is opened, its pin 116 resting on the second arm 115 of the end of striking lever 110 causes said end of striking lever 110 to resume its initial position such that it is locked in position by the lever hook 122.

The opening of the clutch control clamp 8 releases the striking lever 100, its third arm 102 no longer being retained by the clamp 8 until it then rests on the pin 104.

As in the first embodiment, the striking lever 100 pivots around A in the anticlockwise direction such that the first striking feeler lever 38, as well as the minute unit feeler lever 64, and the other feeler levers for the tens of minutes and hours, which were at a distance from their respective cams in order to make it possible to adjust the display members for the countdown, pivot in order to slightly approach their respective cams. However, said striking lever 100 is kept away from the second cam 34 by the foot 64*a* of the minute unit feeler lever 64 resting on the beak 106 of the third arm 102 of the striking lever 100.

The countdown is carried out in the same way as that described above for the first embodiment, the chronograph drive wheel and pinion 1, engaged with the seconds-wheel 4, picking up the first second cam 34 and the stopping of striking cam 120 in order to cause them to turn in the anticlockwise direction. The display members for the hours, tens of minutes and minute units are also driven with their respective cams each time the seconds-hand carried by the chronograph drive wheel and pinion 1 moves to 0. The pivoting at H in the clockwise direction of the detection lever 90 and its arm 92 leads to a pivoting at G, in the anticlockwise direction, of the minute unit feeler lever 64 which gradually approaches the minute unit cam 62 until it comes into contact with the latter when there are less than ten minutes to be counted down.

Figure 13:
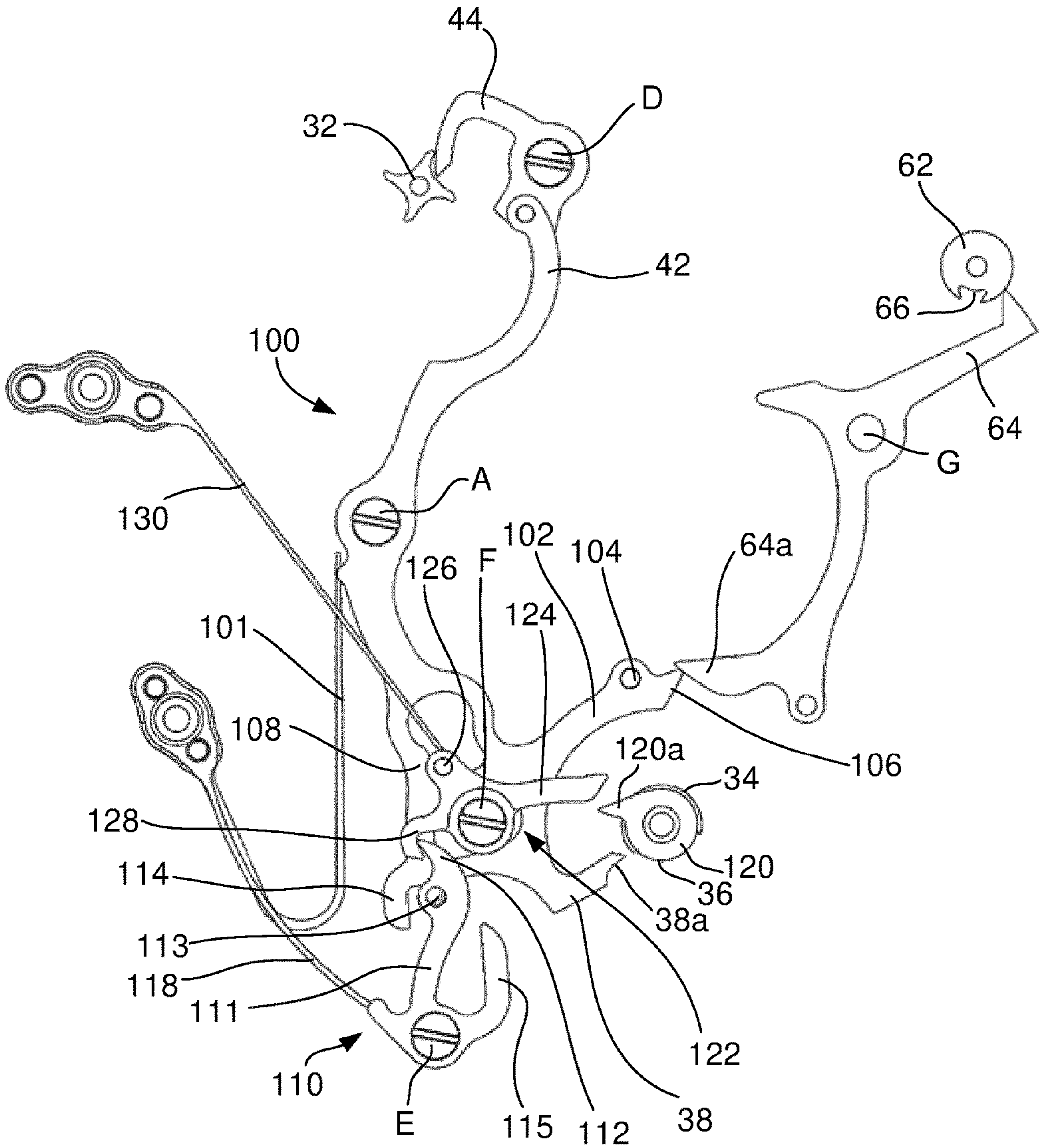
FIGS. 13 to 20 show schematic views of the movement of FIG. 12 in different positions between a countdown at a minute from the end and the end of the countdown of the predetermined time interval.

With reference to FIG. 13, when there is one minute left to be counted down, the display members for the hours and tens of minutes display 0, and the minute unit display member does not yet display 0 such that the minute unit feeler lever 64, in contact with the minute unit cam 62, is not yet engaged in the notch 66 of said minute unit cam 62. In this position, the striking feeler lever 38 is still not in contact with the second cam 34, the beak 106 of the third arm 102 of the striking lever 100 still being retained by the foot 64*a* of the minute unit feeler lever 64. In this position, the striking lever 100, by its second arm 42, keeps the striking geartrain stopped, the stopping of striking lever 44 being engaged in the stopping star 32.

Moreover, the lever hook 122 is at a distance from the stopping of striking cam 120.

Figure 14:
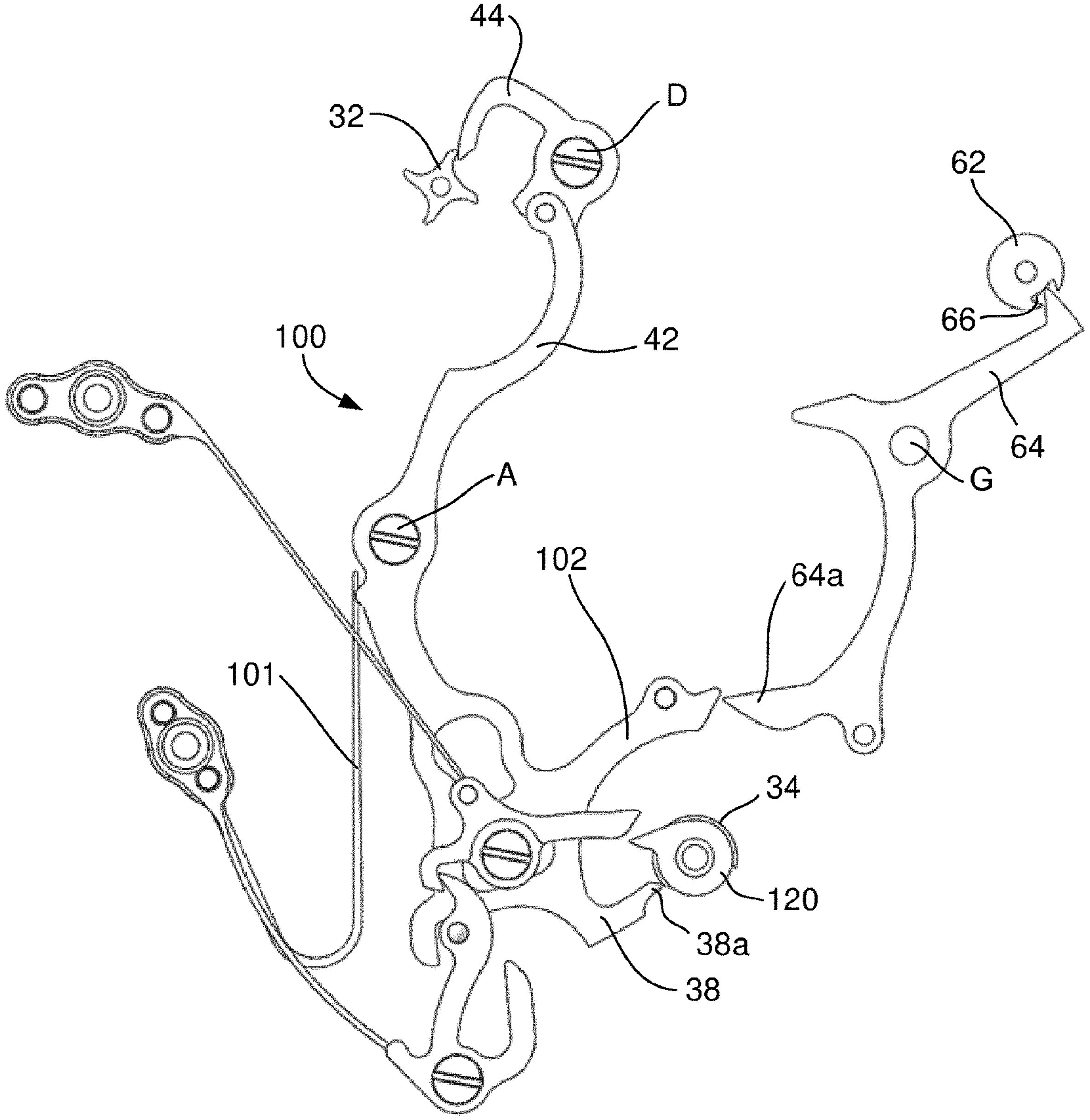

With reference to FIG. 14, when there is less than a minute to be counted down, the display members for the hours and tens of minutes still displaying 0, the minute unit display member is positioned in order to display 0 such that the minute unit feeler lever 64, being in contact with the minute unit cam 62, engages in the notch 66 of said minute unit cam 62 by pivoting at G in the anticlockwise direction.

By pivoting, the foot 64*a* of the minute unit feeler lever 64 releases the third arm 102 and, therefore, the striking lever 100 such that said striking lever 100, as a result of the action of its spring 101, pivots at A in the anticlockwise direction, the beak 38*a* of the striking feeler lever 38 then coming into contact with the maximum radius of the second cam 34 carried by the chronograph drive wheel and pinion 1.

During the pivoting of the striking lever 100, and therefore of its second arm 42, the stopping of striking lever 44 is arranged to start to free itself from the stopping star 32 by pivoting in the clockwise direction around its pivot D. The countdown continues via the chronograph drive wheel and pinion 1 such that the second display member continues turning in the anticlockwise direction with the second cam 34.

Figure 15:
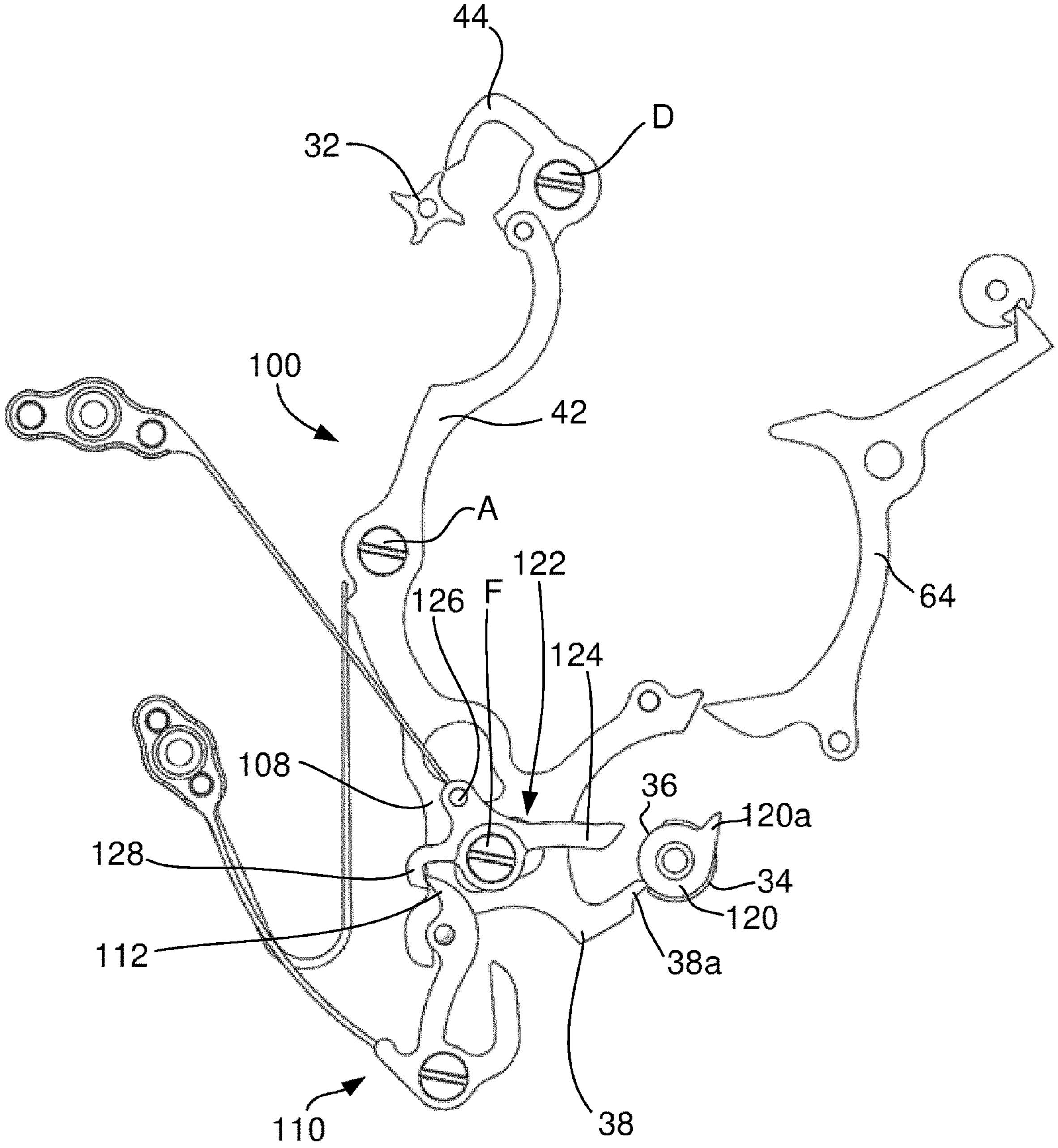

With reference to FIG. 15, the display members for the hours, tens of minutes and minute units still displaying 0, when the second display member displays the specified time before the end of the countdown, for example 20 seconds, the second cam 34 is positioned such that the beak 38*a* of the striking feeler lever 38, being in contact with the second cam 34, engages in the notch 36 of said second cam 34. On falling into the notch 36, the striking feeler lever 38 again pivots at A in the anticlockwise direction. The pivoting at A of the striking feeler lever 38 means the pivoting at A in the anticlockwise direction of the striking lever 100 and, in particular, of its second arm 42 such that the stopping of striking lever 44 frees itself from the stopping star 32 by pivoting in the clockwise direction around its pivot D, and releases it. The striking geartrain being released, the striking-mechanism starts striking at the specified time before the end of the countdown.

In parallel, the fourth arm 108 of the striking lever 100 has also pivoted in the anticlockwise direction such that it leads to the tilting of the lever hook 122, via its pin 126, in the clockwise direction around its pivot F so that its arm 124 enters the radius of gyration of the beak 120*a* of the stopping of striking cam 120 carried by the chronograph drive wheel and pinion 1.

By pivoting at F in the clockwise direction, the arm 128 of the lever hook 122 has slightly freed itself from the beak 112 of the end of striking lever 110.

Figure 16:
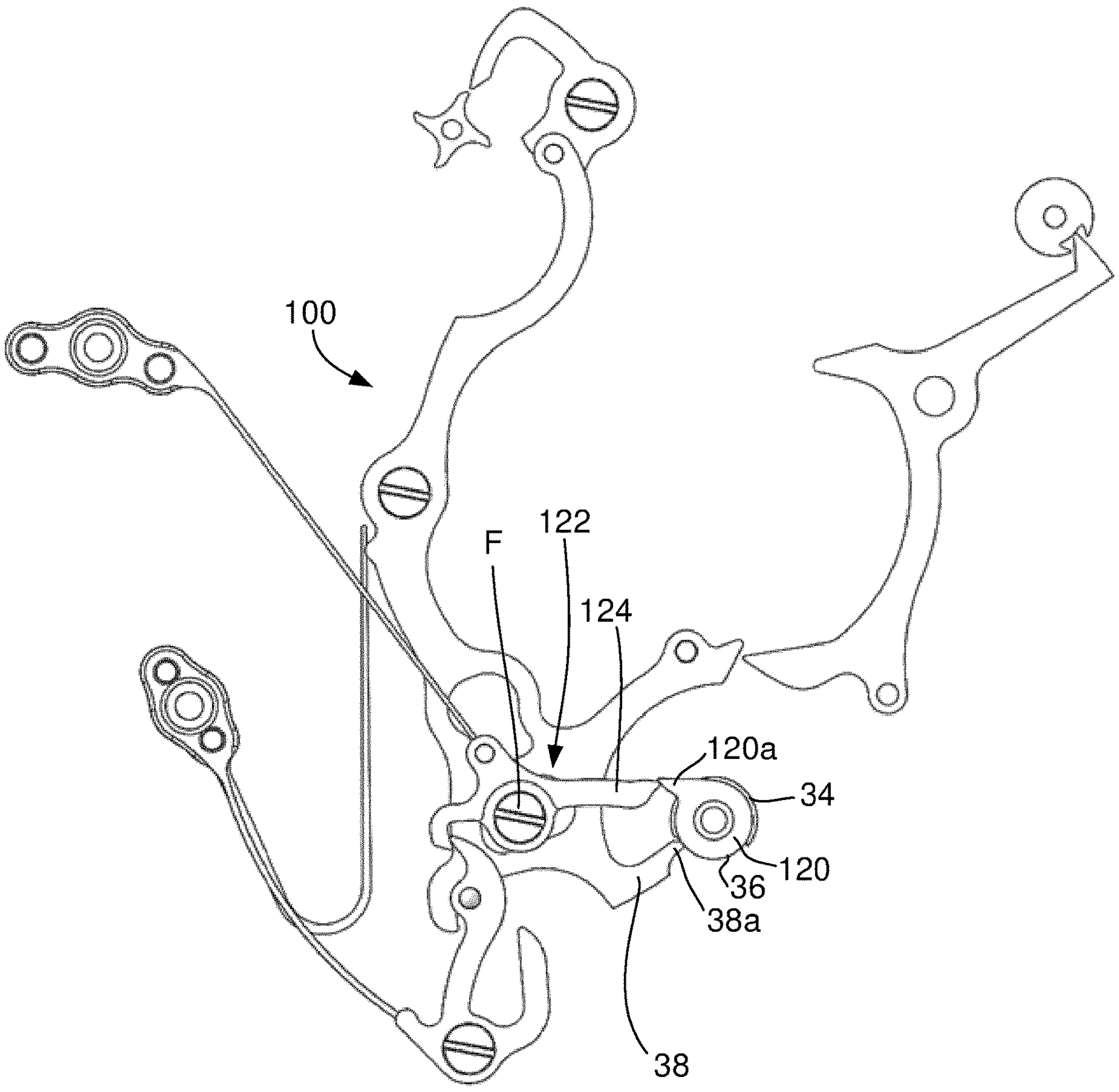

With reference to FIG. 16, when the countdown ends and virtually reaches zero, for example 5 seconds before the end of the countdown, the second display member is positioned with the second cam 34 and the stopping of striking cam 120 in order to display for example 5, the striking still being in progress. The positioning of the beak 120*a* of the stop cam 120 is such that said beak 120*a* enters into contact with the arm 124 of the lever hook 122 in order to be capable of driving it in rotation at F in the clockwise direction.

The beak 38*a* of the striking feeler lever 38 has reached the end of the notch 36.

Figure 17:
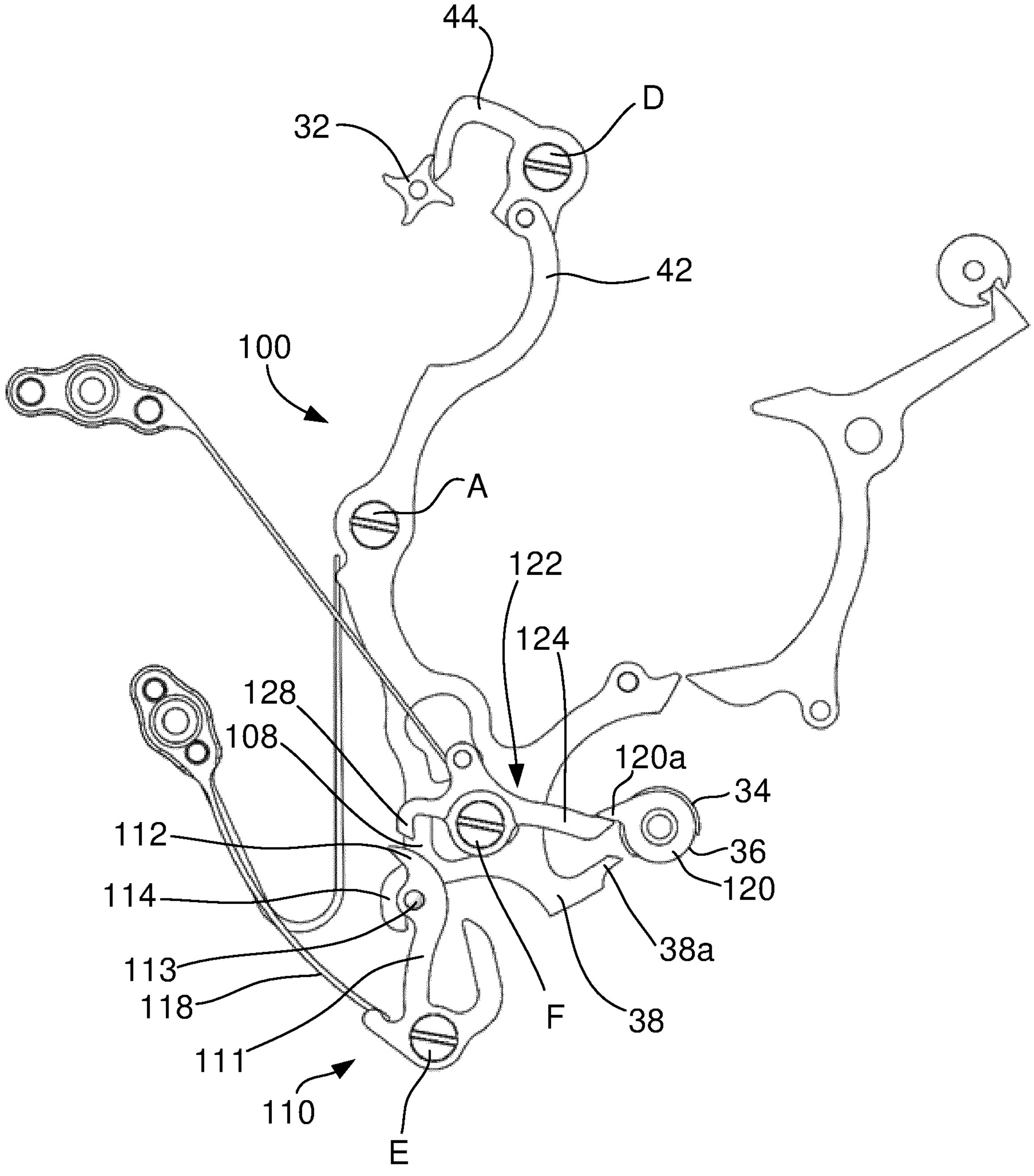

With reference to FIG. 17, when the countdown ends and reaches zero, the display members for the hours, tens of minutes and minute units still displaying 0, the second display member is positioned with the second cam 34 and the stopping of striking cam 120 in order to display 0.

The lever hook 122 and the beak 120*a* of the stopping of striking cam 120 are configured so that, when 0 is displayed at the end of the countdown, the lever hook 122 controlled by the stopping of striking cam 120 has tilted at F in the clockwise direction sufficiently so that its arm 128 releases the beak 112 of the stopping of striking lever 110.

The end of striking lever 110 is then released and pivots at E in the anticlockwise direction, as a result of the action of its spring 118.

The pivoting of the end of striking lever 110 at the end of the countdown means the pivoting in the anticlockwise direction of its first arm 111, such that the pin 113 carried by said arm 111 drives the end in the form of a hook 114 of the fourth arm 108 of the striking lever 100 in order to cause said striking lever 100 to pivot at A in the clockwise direction. This pivoting of the striking lever 100 at A in the clockwise direction makes it possible to free the striking feeler lever 38 from the second cam 34. In parallel, during this pivoting at A of the striking lever 100 in the clockwise direction, and therefore of its arm 42, at the same time as the end of the countdown, the stopping of striking lever 44 is driven by the arm 42 in order to pivot in the anticlockwise direction around its pivot D in order to again come to cooperate with the stopping star 32 and to stop the striking geartrain. Thus, the striking is stopped at the same time as the end of the countdown.

Figure 18:
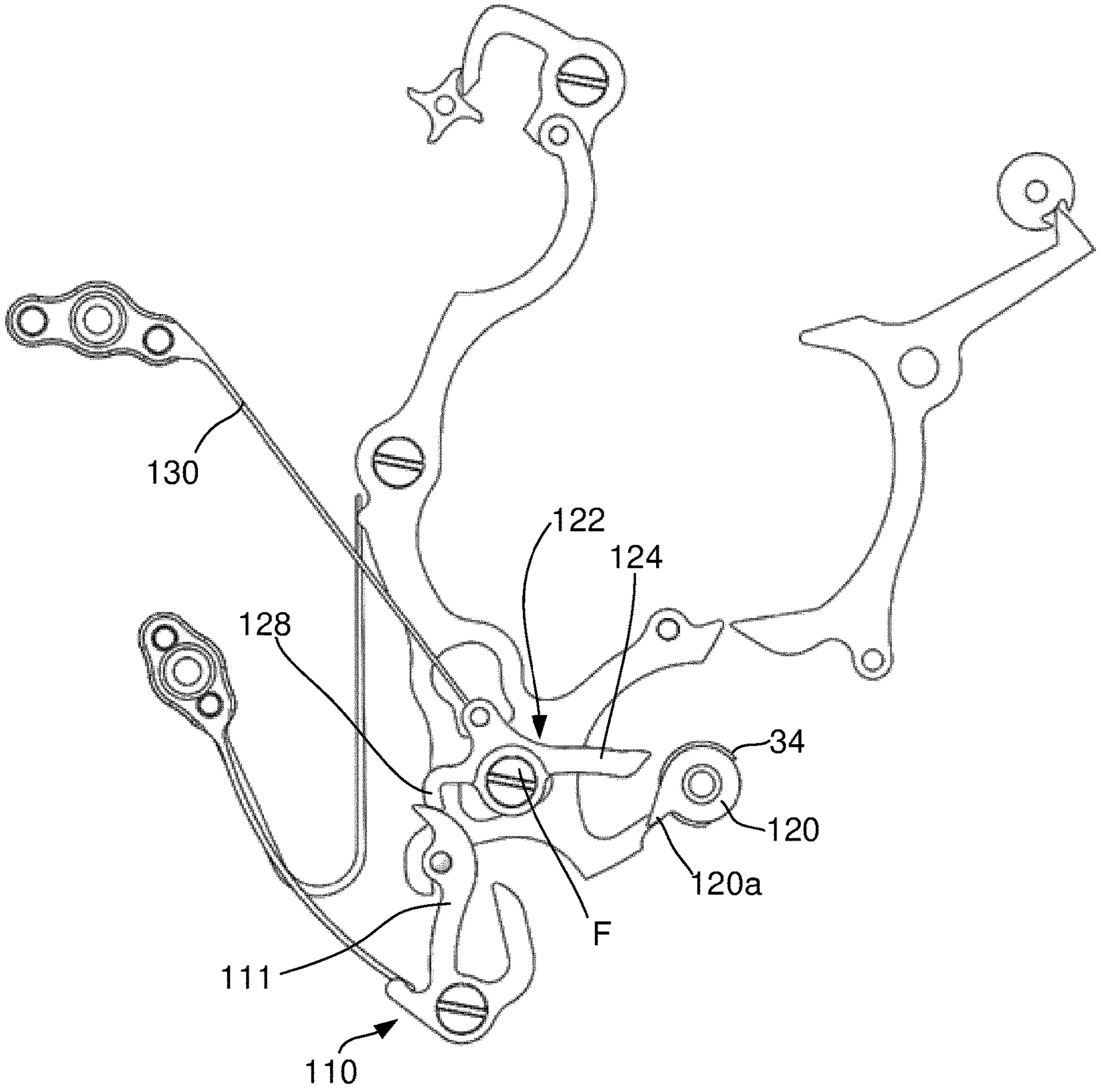

With reference to FIG. 18, once the striking has stopped, the second display member, that is to say the chronograph seconds-hand, continues its travel with the second cam 34 and the stopping of striking cam 120 in the anticlockwise direction such that the beak 120*a* of said stopping of striking cam 120 passes the arm 124 of the lever hook 122 and releases it. Once released, the lever hook 122 pivots at F in the anticlockwise direction, as a result of the action of its spring 130, until its second arm 128 in the form of a hook comes to rest on the arm 111 of the end of striking lever 110. Thus, the lever hook 122 exits the radius of gyration of the stopping of striking cam 120, which makes it possible to avoid any unnecessary energy consumption when the seconds-hand continues its travel while waiting for a manual stoppage of the chronograph mechanism.

Figure 19:
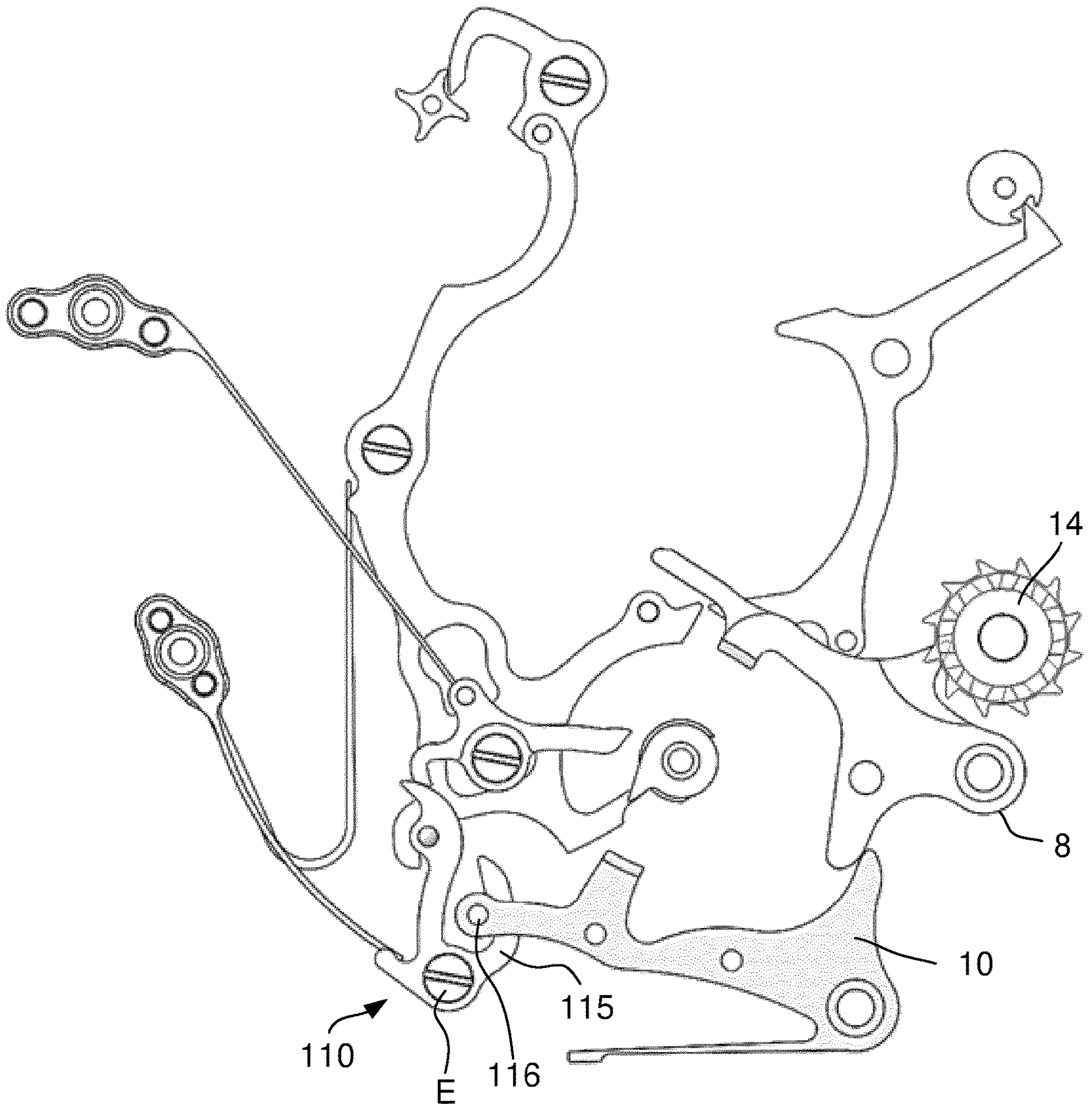
Figure 20:
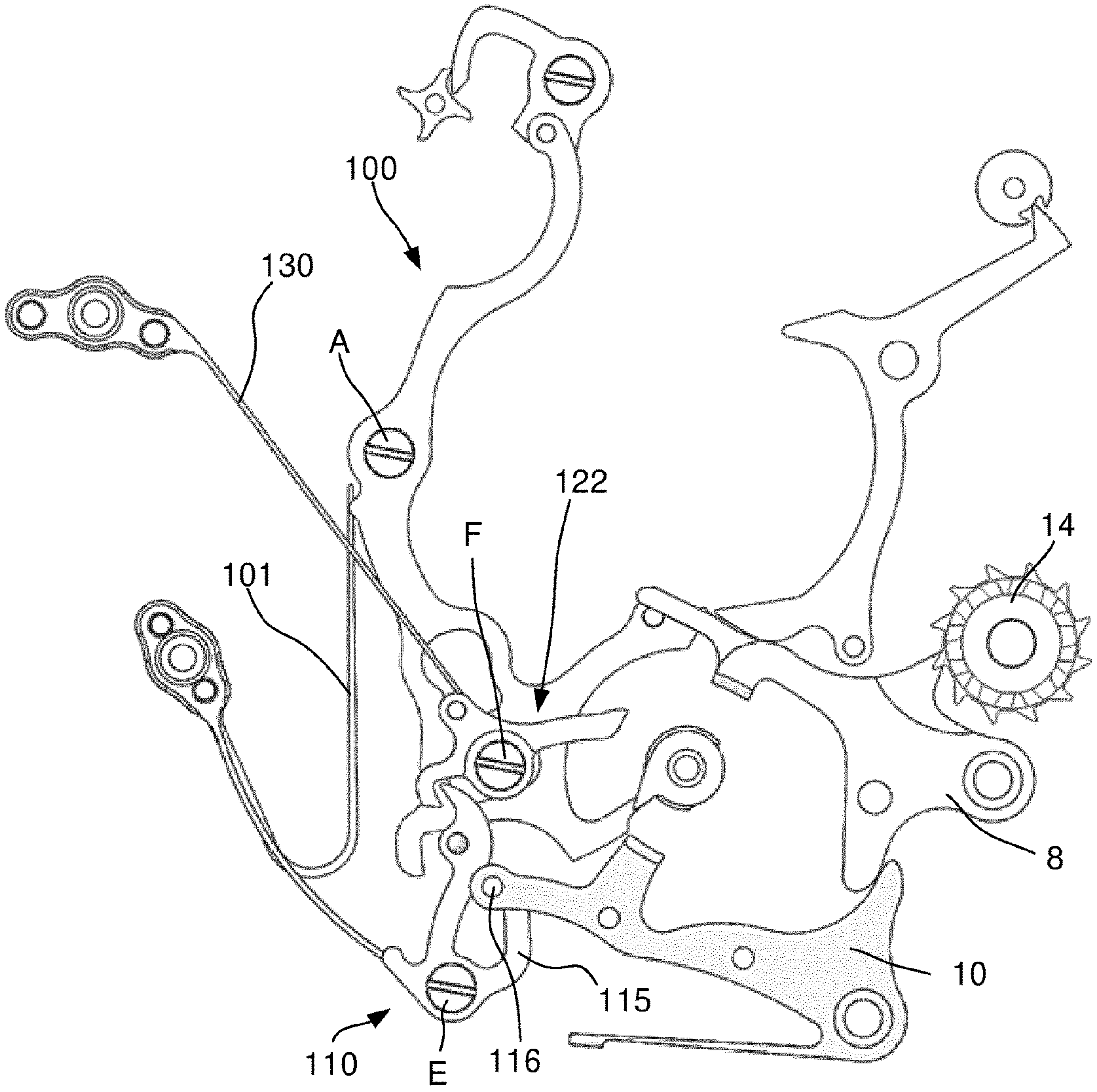

With reference to FIGS. 19 and 20, when the user manually stops the chronograph mechanism in order to stop the seconds-hand, he presses the control member of the chronograph mechanism in order to trigger the STOP such that the column wheel 14 turns in such a way as to close the clutch control clamp 8 and the clutch clamp 10 in order to disengage the clutch device 6 in order to disengage the seconds-wheel 4 and the chronograph drive wheel and pinion 1. As illustrated in FIG. 19, when the clutch clamp 10 which was in the open position closes, it pivots in the clockwise direction such that its pin 116 drives the second arm 115 of the end of striking lever 110 in such a way as to cause said end of striking lever 110 to pivot at E in the clockwise direction, and also the lever hook 122 resting on said end of striking lever 110.

When the clamps 8, 10 are closed as illustrated in FIG. 20, the end of striking lever 110, having completed its travel, remains held by the pin 116 of the clutch clamp 10. The end of striking lever 110 will be locked by the arm 128 of the lever hook 122 resuming its initial position by pivoting at F in the anticlockwise direction as a result of the action of its spring 130 when the striking lever 100, released by the opening of the clutch control clamp 8 during the next start of countdown, pivots at A in the anticlockwise direction as a result of the action of its spring 101.

Figure 21:
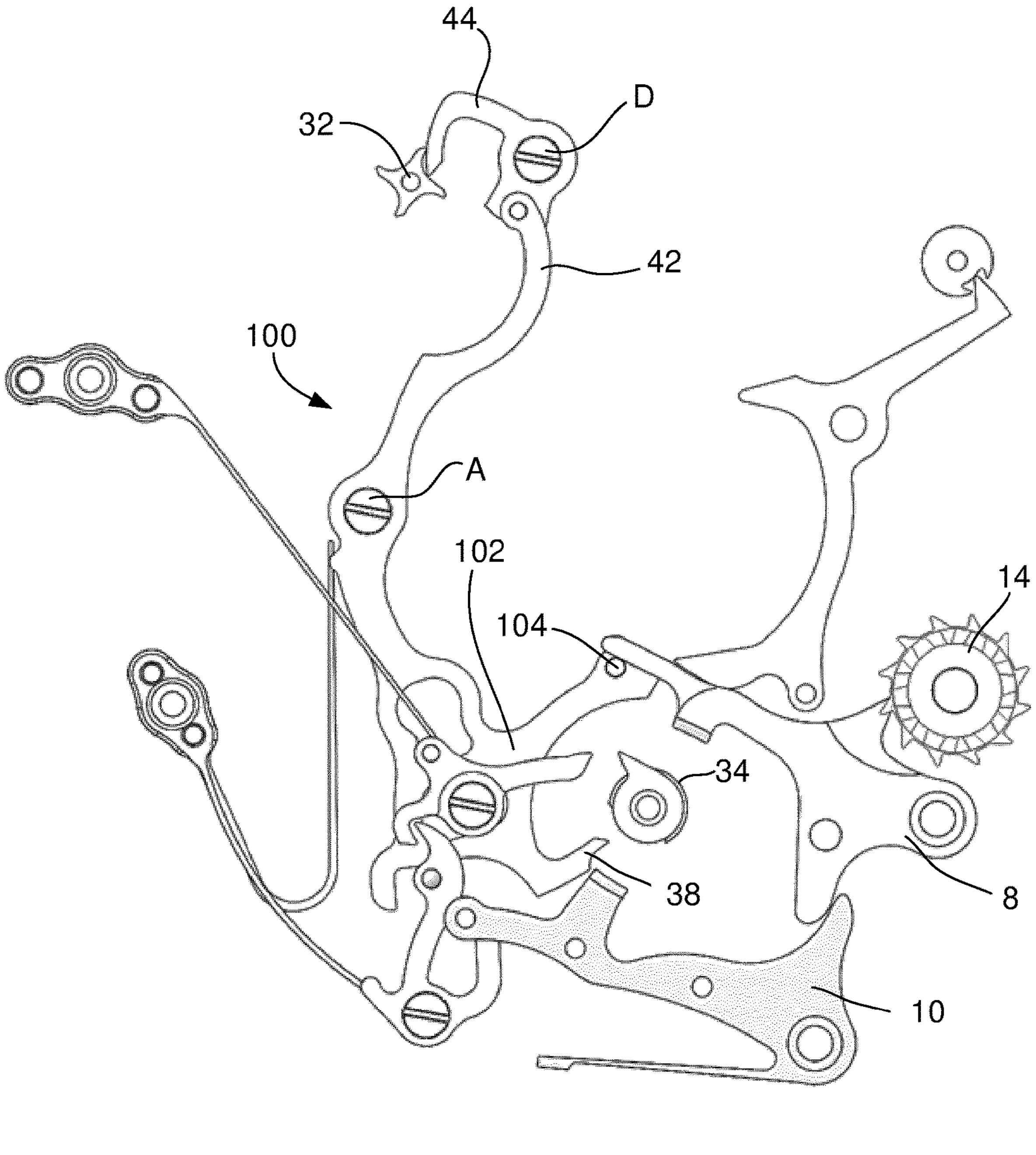
FIG. 21 shows a view of the movement of the figure in the STOP position during striking.

It is of course possible to make a STOP, for example during the countdown and the striking, the mechanism then being in a configuration similar to that of FIG. 15 or 16. In this configuration, the clutch control clamp 8 is not in contact with the striking lever 100 since it is in the open position and does not rest on the pin 104 of the third arm 102 of the striking lever 100. With reference to FIG. 21, when the user stops the countdown, the clamps 8 and 10 close, controlled by the column wheel 14. The clutch control clamp 8 pivots in the anticlockwise direction in order to come to rest on the pin 104 of the third arm 102 of the striking lever 100 such that said striking lever 100 pivots at A in the clockwise direction. This pivoting of the striking lever 100 at A in the clockwise direction makes it possible to free the striking feeler lever 38 from the second cam 34. In parallel, during this pivoting at A of the striking lever 100 in the clockwise direction, and therefore of its arm 42, the stopping of striking lever 44 is driven by said arm 42 in order to pivot in the anticlockwise direction around its pivot D in order to again come to cooperate with the stopping star 32 and to stop the striking geartrain. Thus, the striking is stopped. During the next start of the countdown without a prior adjustment of the display members in order to display a countdown, the different parts will resume their position before the next STOP.

The present invention makes it possible to have a countdown chronograph mechanism equipped with a striking-mechanism which is triggered before the end of the countdown of a predetermined time interval at a predefined time before the end of the countdown in order to warn a user that the countdown in progress of said predetermined time interval is about to come to an end. Thus, the present invention makes it possible to have a countdown having a pre-alarm using a mechanical striking-mechanism, the end of the striking being synchronized with the end of the countdown of said predetermined time interval. According to the variants, the chronograph mechanism can stop at the end of the countdown of said predetermined time interval or remain activated such that the chronograph seconds-hand continues turning without triggering a striking.

The invention claimed is:

1. A mechanical timepiece movement comprising a chronograph mechanism arranged to be capable of carrying out at least one countdown of a predetermined time interval, comprising display means arranged to display at least the time remaining until the end of the countdown of said predetermined time interval, at least one member for controlling the start of the countdown, and a striking-mechanism, wherein said striking-mechanism is arranged to start striking at a specified time before the end of the countdown and to stop striking at the end of said countdown of said predetermined time interval, wherein the chronograph mechanism is configured to be capable of being kinematically connected to a base movement by a lateral or vertical clutch device.

2. The movement according to claim 1, wherein the chronograph mechanism comprises at least one chronograph drive wheel and pinion arranged to be capable of performing a countdown, and wherein the striking-mechanism comprises at least one first cam kinematically linked to said chronograph drive wheel and pinion and on which said specified time before the end of the countdown of the predetermined time interval is programmed, said first cam being arranged to make one revolution over a time greater than the specified time before the end of the countdown of said predetermined time interval, a striking geartrain, a first striking lever comprising a first striking feeler lever arranged to be capable of cooperating with said first cam and said striking geartrain in order to trigger the striking at the start of the specified time before the end of the countdown of said predetermined time interval and an end of striking mechanism arranged to be capable of cooperating with said first striking lever in order to control the stopping of the striking at the end of said specified time at the same time as the end of the countdown of said predetermined time interval.

3. The movement according to claim 2, wherein the display means of the chronograph mechanism comprise a first display member associated with the first cam for displaying a countdown obtained via the chronograph drive wheel and pinion.

4. The movement according to claim 3, wherein the first display member is arranged to display a minute unit countdown.

5. The movement according to claim 3, wherein the first display member is arranged to display a second countdown.

6. The movement according to claim 2, wherein the first display member is arranged to display a minute unit countdown.

7. The movement according to claim 6, wherein the display means of the chronograph mechanism comprise a third tens of minutes display member arranged to display the tens of minutes countdown of said predetermined time interval and wherein the striking-mechanism comprises a third tens of minutes cam associated with said third tens of minutes display member, and a fourth tens of minutes feeler lever arranged to be capable of cooperating with said third tens of minutes cam, said third tens of minutes cam being programmed to indicate the end of the tens of minutes countdown to the fourth tens of minutes feeler lever, said fourth tens of minutes feeler lever being arranged to cooperate with the first striking feeler lever such that said first striking feeler lever comes to cooperate with said first cam at the end of the tens of minutes countdown.

8. The movement according to claim 7, wherein the display means of the chronograph mechanism comprise a fourth hour display member arranged to display the hour countdown of said predetermined time interval and wherein the striking-mechanism comprises a fourth hour cam associated with said fourth hour display member, and a fifth hour feeler lever arranged to be capable of cooperating with said fourth hour cam, said fourth hour cam being programmed to indicate the end of the hour countdown to the fifth hour feeler lever, said fifth hour feeler lever being arranged to cooperate with the fourth tens of minutes feeler lever such that said fourth tens of minutes feeler lever comes to cooperate with said third tens of minutes cam at the end of the hour countdown.

9. The movement according to claim 2, wherein the first display member is arranged to display a second countdown.

10. The movement according to claim 9, wherein the display means of the chronograph mechanism comprise a second minute unit display member arranged to display the minute unit countdown of said predetermined time interval and wherein the striking-mechanism comprises a second minute unit cam associated with said second minute unit display member, and a third minute unit feeler lever arranged to be capable of cooperating with said second minute unit cam, said second minute unit cam being programmed to indicate the end of the minute unit countdown to the third minute unit feeler lever, said third minute unit feeler lever being arranged to cooperate with the first striking feeler lever such that said first striking feeler lever comes to cooperate with the first cam at the end of the minute unit countdown.

11. The movement according to claim 10, wherein the display means of the chronograph mechanism comprise a third tens of minutes display member arranged to display the tens of minutes countdown of said predetermined time interval and wherein the striking-mechanism comprises a third tens of minutes cam associated with said third tens of minutes display member, and a fourth tens of minutes feeler lever arranged to be capable of cooperating with said third tens of minutes cam, said third tens of minutes cam being programmed to indicate the end of the tens of minutes countdown to the fourth tens of minutes feeler lever, said fourth tens of minutes feeler lever being arranged to cooperate with the third minute unit feeler lever such that said third minute unit feeler lever comes to cooperate with said second minute unit cam at the end of the tens of minutes countdown.

12. The movement according to claim 11, wherein the display means of the chronograph mechanism comprise a fourth hour display member arranged to display the hour countdown of said predetermined time interval and wherein the striking-mechanism comprises a fourth hour cam associated with said fourth hour display member, and a fifth hour feeler lever arranged to be capable of cooperating with said fourth hour cam, said fourth hour cam being programmed to indicate the end of the hour countdown to the fifth hour feeler lever, said fifth hour feeler lever being arranged to cooperate with the fourth tens of minutes feeler lever such that said fourth tens of minutes feeler lever comes to cooperate with said third tens of minutes cam at the end of the hour countdown.

13. The movement according to claim 12, wherein the third minute unit feeler lever, the fourth tens of minutes feeler lever and the fifth hour feeler lever form a single lever.

14. The movement according to claim 13, wherein the first striking feeler lever, the third minute unit feeler lever, the fourth tens of minutes feeler lever and the fifth hour feeler lever form a single lever.

15. The movement according to claim 1, wherein the end of striking mechanism comprises an end of striking lever comprising a second end of striking feeler lever arranged to be capable of cooperating with the first cam in order to control a disconnection of the clutch device and the stopping of the striking at the end of the countdown of said predetermined time interval.

16. The movement according to claim 1, wherein the end of striking mechanism comprises an end of striking lever arranged to cooperate with the first striking lever and a stopping of striking cam kinematically linked to the chronograph drive wheel and pinion and arranged to control said end of striking lever in order to stop the striking at the end of the countdown of said predetermined time interval without disconnecting the clutch device.

* * * * *